US012756356B2

(12) United States Patent
Dai et al.

(10) Patent No.: US 12,756,356 B2
(45) Date of Patent: Oct. 6, 2026

(54) TRANSPORT APPARATUS AND METHOD FOR CLEANING ROBOT OF PHOTOVOLTAIC MODULE

(71) Applicant: Langfang Sol-Bright New Energy Technology Co., Ltd., Sanhe City (CN)

(72) Inventors: Gaobing Dai, Sanhe City (CN); Xinghua Zhang, Sahne City (CN); Tianran Xu, Sanhe City (CN)

(73) Assignee: Lanfang Sol-Bright New Energy Technology Co. Ltd., Sanhe City (CN)

( * ) Notice: Subject to any disclaimer, the term of this patent is extended or adjusted under 35 U.S.C. 154(b) by 207 days.

(21) Appl. No.: 18/703,075

(22) PCT Filed: Dec. 1, 2021

(86) PCT No.: PCT/CN2021/134867

§ 371 (c)(1),
(2) Date: Apr. 19, 2024

(87) PCT Pub. No.: WO2023/065471

PCT Pub. Date: Apr. 27, 2023

(65) Prior Publication Data

US 2025/0233554 A1 Jul. 17, 2025

(30) Foreign Application Priority Data

Oct. 21, 2021 (CN) ......................... 202111228134.5

(51) Int. Cl.
*H02S 40/10* (2014.01)
*G05D 1/242* (2024.01)
(Continued)

(52) U.S. Cl.
CPC ............. *H02S 40/10* (2014.12); *G05D 1/242* (2024.01); *G05D 1/622* (2024.01); *G05D 1/648* (2024.01); *G05D 2105/10* (2024.01)

(58) Field of Classification Search
CPC ........ H02S 40/10; G05D 1/242; G05D 1/622; G05D 1/648; G05D 2105/10
See application file for complete search history.

(56) References Cited

U.S. PATENT DOCUMENTS

2017/0093330 A1* 3/2017 Castellucci ............. H02S 20/32
2018/0087908 A1 3/2018 Bailey et al.

FOREIGN PATENT DOCUMENTS

CN 207076748 U 3/2018
CN 109047086 A 12/2018
(Continued)

OTHER PUBLICATIONS

Office action, dated Aug. 24, 2022, Chinese National Application No. 202111228134.5, 11 pages.
(Continued)

*Primary Examiner* — Michael D Lang
(74) *Attorney, Agent, or Firm* — Stinson LLP

(57) ABSTRACT

A transport apparatus and method for a cleaning robot of a photovoltaic module. The photovoltaic module comprises a plurality of solar panels and a support part (102*a*). The transport apparatus comprises: a mobile unit (101), an adjustment unit (102), and a loading platform (103). The mobile unit (101) is configured to move according to a first moving trajectory, and carry and automatically transport the adjustment unit (102), the loading platform (103), and a cleaning robot to a parking position corresponding to the photovoltaic module. The adjustment unit (102) is mounted above the mobile unit (101), and is configured to adjust the height and inclination angle of the loading platform (103) at the parking position to align the loading platform (103) with the photovoltaic module. The loading platform (103) is arranged above the adjustment unit (102), and is configured to carry the cleaning robot. When the mobile unit (101) moves to the parking position, and the loading platform
(Continued)

(103) is aligned with the photovoltaic module, the cleaning robot can move from the loading platform (103) to the photovoltaic module.

19 Claims, 18 Drawing Sheets

(51) Int. Cl.

| | |
|---|---|
| ***G05D 1/622*** | (2024.01) |
| ***G05D 1/648*** | (2024.01) |
| ***G05D 105/10*** | (2024.01) |

(56) References Cited

FOREIGN PATENT DOCUMENTS

| | | | |
|---|---|---|---|
| CN | 109108034 | A | 1/2019 |
| CN | 109560766 | A | 4/2019 |
| CN | 110420955 | A | 11/2019 |
| CN | 111338359 | A | 6/2020 |
| CN | 210876678 | U | 6/2020 |
| CN | 111438099 | A | 7/2020 |
| CN | 111464116 | A | 12/2020 |
| CN | 112007890 | A | 12/2020 |
| CN | 114178281 | A | 3/2022 |
| WO | 2023065471 | A1 | 4/2023 |

OTHER PUBLICATIONS

Office action, dated Feb. 15, 2023, Chinese National Application No. 202111228134.5, 14 pages.

International Searching Authority, International Search Report, dated Jul. 19, 2022, International Application No. PCT/CN2021/134867, 6 pages.

* cited by examiner

Section A-A

Section B-B

TRANSPORT APPARATUS AND METHOD FOR CLEANING ROBOT OF PHOTOVOLTAIC MODULE

REFERENCE TO RELATED APPLICATIONS

This application is the 371 U.S. national stage application of International Patent Application No. PCT/CN2021/134867, filed Dec. 1, 2021, claiming priority to Chinese Application No. 202111228134.5, filed Oct. 21, 2021, the entire disclosures of which are incorporated herein by reference.

TECHNICAL FIELD

The present application relates to the technical field of photovoltaic module cleaning in photovoltaic power stations, in particular to a transport apparatus and method for a cleaning robot of a photovoltaic module.

BACKGROUND TECHNIQUE

In the prior art, the photovoltaic modules deployed in the photovoltaic power station are usually cleaned by a single row of cleaning robots. To use a single row of cleaning robots to clean photovoltaic modules, it is necessary to manually deploy a large number of cleaning robots on the photovoltaic modules in sequence, so that the cleaning robots can complete the cleaning of photovoltaic modules. This method is not only costly, but also needs to waste a lot of manpower and material resources.

CONTENTS OF THE INVENTION

The present application provides a transport apparatus for a cleaning robot of a photovoltaic module to solve the above-mentioned problems in the prior art. The present application also provides a cleaning method for photovoltaic modules.

The transport apparatus for a cleaning robot of a photovoltaic module provided by the present application, wherein the photovoltaic module includes a plurality of solar panels and support parts, and the device includes: a mobile unit, an adjustment unit, and a loading platform.

The mobile unit is configured to move according to the first moving trajectory, carry and automatically transport the adjustment unit, the loading platform and a cleaning robot to a parking position corresponding to the photovoltaic module.

The adjustment unit is installed above the mobile unit, and is used to adjust the height and inclination angle of the loading platform at the parking position, so that the loading platform is aligned with the photovoltaic module.

The loading platform is arranged on the adjustment unit and is used to carry the cleaning robot.

When the mobile unit moves to the parking position and the loading platform is aligned with the photovoltaic module, the cleaning robot can move from the loading platform to the photovoltaic module.

Optionally, the mobile unit further includes a first memory and a first controller. The first memory is used to acquire the first layout information, and the first controller generates the first moving trajectory according to the first layout information.

Optionally, the exterior of the mobile unit includes a plurality of first radars.

The plurality of first radars are used to detect the position information of obstacles on the moving trajectory of the mobile unit when the mobile unit moves according to the preset moving trajectory, and send the position information of the obstacles to the first controller.

The first controller is further configured to receive position information of the obstacle, and update the moving trajectory to avoid the position of the obstacle.

Optionally, a second radar is installed in the middle position of the side of the mobile unit facing the photovoltaic module;

The second radar is used to detect the support part of the photovoltaic module, obtain distance information between the mobile unit and the support part, and send the distance information to the first controller, so that the first controller controls the mobile unit to move to the parking position.

Optionally, the second radar detects the support part of the photovoltaic module in the following manner to obtain distance information between the mobile unit and the support part:

Obtain moving speed information of the mobile unit;

Obtain a complete time length that the support part is detected by the second radar;

Obtain the size and center information of the support part according to the moving speed information of the mobile unit and the complete time length;

Obtain the time information of the mobile unit traveling in the direction of the moving trajectory during the detection process, and obtain the distance between the mobile unit and the support part according to the time information, the moving speed information, and the size and center information of the support part.

Optionally, a first support part and a second support part are installed on the bottom of the photovoltaic module, and the first support part and the second support part are symmetrically installed on both sides of the central position of the photovoltaic module;

The second detection radar detects the support part of the photovoltaic module in the following manner to obtain the distance information between the mobile unit and the central position:

Obtain moving speed information of the mobile unit;

Obtain the complete time length from the appearance of the first support part to the disappearance of the second support part in the detection field of view;

Obtain center information of the first support part and the second support part according to the moving speed information of the mobile unit and the complete time length;

Obtain the time information of the mobile unit traveling in the direction of the moving trajectory during the detection process, and obtain the distance between the mobile unit and the parking position according to the time information, the moving speed information and the center information.

Optionally, the mobile unit is equipped with a second controller, and the second controller is used to adjust the height, inclination angle and direction of the loading platform according to the installation height and the preset inclination angle of the photovoltaic module;

The adjustment unit includes: a support plate, a first loading platform height adjustment rod and a second loading platform height adjustment rod; wherein, the first loading platform height adjustment rod and the second loading platform height adjustment rod are respectively vertically installed at the center positions of the first and second edges of the support plate. The first loading platform height adjustment rod is installed at the center position of the first edge of the support plate facing the photovoltaic module, and the second loading platform height adjustment rod is installed at the center position of the second edge of the support plate away from the photovoltaic module;

The tops of the first loading platform height adjustment rod and the second loading platform height adjustment rod are respectively connected to the loading platform;

The first loading platform height adjustment rod includes: a first telescopic rod and a first motor;

The second loading platform height adjustment rod includes: a second telescopic rod and a second motor;

Both ends of the first telescopic rod are respectively connected to the support plate and the loading platform, and the first motor is fixed at one end of the first telescopic rod connected to the support plate to drive the other end of the first telescopic rod connected to the loading platform telescoping;

Both ends of the second telescopic rod are respectively connected to the support plate and the loading platform, and the second motor is fixed at one end of the second telescopic rod connected to the support plate to drive the other end of the second telescopic rod connected to the loading platform telescoping.

Optionally, the adjustment unit further includes: a loading platform angle adjustment rod;

One side of the loading platform angle adjustment rod is movably connected to the tail of the support plate, and the other side is movably connected to the tail of the loading platform;

The loading platform angle adjustment rod includes: a third telescopic rod and a third motor;

Both ends of the third telescopic rod are respectively connected to the end of the support plate and the loading platform opposite to the moving direction; the third motor is fixed at one end of the third telescopic rod to drive the third telescopic rods telescoping.

Optionally, the device also includes: loading platform direction adjustment rod;

One side of the loading platform direction adjustment rod is installed on the upper part of the mobile unit, and the other side is movably connected to the bottom of the adjustment unit;

The loading platform direction adjustment rod includes: a fourth telescopic rod and a fourth motor;

Both ends of the fourth telescopic rod are respectively connected to the upper part of the mobile unit and the bottom of the adjustment unit; the fourth motor is fixed at one end of the fourth telescopic rod, and drives the fourth telescopic rod telescoping.

Optionally, a third radar is installed at the center of the loading platform;

The third radar is used to detect the height of the photovoltaic module relative to the ground, and send the height of the photovoltaic module to the second controller;

The second controller is configured to control the first loading platform height adjustment rod and the second loading platform height adjustment rod to adjust the height of the loading platform from the ground according to the installation height of the photovoltaic module, until the height of the loading platform from the ground is the same as the height of the photovoltaic module relative to the ground.

Optionally, the loading platform is equipped with a first goniometer;

The first goniometer is used to detect the inclination angle of the loading platform facing the installation position of the photovoltaic module, and send the inclination angle to the second controller;

The second controller is configured to control the first telescopic rod and/or the second telescopic rod to telescope when the inclination angle is not zero, so that one side of the loading platform rises or falls until the inclination angle detected by the first goniometer is zero.

Optionally, the loading platform is equipped with a second goniometer;

The second goniometer is used to detect the inclination angle of the loading platform along the travel direction of the mobile unit, and send the inclination angle to the second controller;

The second controller is used to obtain the installation inclination angle of the photovoltaic module, and when the installation inclination angle is different from the inclination angle measured by the second goniometer, the second controller controls the loading platform adjustment rod to push the third telescopic rod connected to the tail of the loading platform to telescope until the angle measured by the second goniometer is the same as the installation inclination angle.

Optionally, a fourth radar and a fifth radar are respectively installed on the side of the loading platform facing the photovoltaic module and on both sides of the center of the loading platform;

The fourth radar and the fifth radar are used to detect the edge of the photovoltaic module, and send the detection result to the second controller;

The second controller is used to control the loading platform angle adjustment rod to push the loading platform to adjust the inclination angle of the platform when the fourth radar and the fifth radar do not detect the edge of the photovoltaic module at the same time, until the first photovoltaic module edge detection radar and the second photovoltaic module detection radar simultaneously detect the edge of the photovoltaic module.

Optionally, a first distance sensor and a second distance sensor are respectively installed on the side of the loading platform facing the photovoltaic module and on both sides of the center of the loading platform;

The first distance sensor is used to determine the first distance between the installation position of the first distance sensor and the edge of the photovoltaic module; the second distance sensor is used to determine the second distance between the installation position of the second distance sensor and the edge of the photovoltaic module;

The second controller is configured to control the loading platform direction adjustment push rod to adjust the direction of the loading platform when the first distance and the second distance are different, until the first distance is the same as the second distance.

Optionally, the loading platform further includes: a telescopic track, a track motor and a third distance sensor and the track motor is used to drive the telescopic track; the transport apparatus for a cleaning robot of a photovoltaic module.

The third distance sensor is used to determine the third distance between the telescopic track and the photovoltaic module;

The second controller is configured to obtain the third distance, and when the third distance is greater than a preset distance threshold, the second controller controls the track motor to drive the telescopic track to extend towards the photovoltaic module, so as to make the third distance not greater than the preset distance threshold.

This application also provides a transport method for a cleaning robot of a photovoltaic module, which is applied to the above-mentioned device, including:

After the mobile unit carries and automatically transports the adjustment unit, the loading platform and the cleaning robot to the parking position corresponding to the photovoltaic module according to the first moving trajectory, the height of the photovoltaic module relative to the ground and the inclination angle of the photovoltaic module are determined;

According to the height of the photovoltaic module relative to the ground and the inclination angle of the photovoltaic module, the adjustment unit is controlled to adjust the height and inclination angle of the loading platform, so that the loading platform is aligned with the photovoltaic module;

Wherein, when the loading platform is aligned with the photovoltaic module, the cleaning robot can move from the loading platform to the photovoltaic module.

Optionally, the first moving trajectory is obtained in the following manner:

Obtain the first moving trajectory sent by the photovoltaic power station through the wireless communication system; or, Obtain the first layout information of the photovoltaic modules in the photovoltaic power station sent by the photovoltaic power station through the wireless communication system; according to the first layout information, obtain the first moving trajectory information.

Optionally, the parking position of the transport apparatus for a cleaning robot of a photovoltaic module includes: a position on the first moving trajectory corresponding to the support part of the photovoltaic module; the transport apparatus for a cleaning robot of a photovoltaic module uses the following method to determine the distance between the transport apparatus for a cleaning robot of a photovoltaic module and the parking position:

Obtain moving speed information of the mobile unit;

Obtain the complete time length that the support part is detected by the second detection radar, the second detection radar is arranged at the middle position of the side of the mobile unit facing the photovoltaic module;

Obtain the size and center information of the support part according to the moving speed information of the mobile unit and the complete time length;

Obtain the time information of the mobile unit traveling in the direction of the moving trajectory during the detection process, and obtain the distance information between the mobile unit and the parking position according to the time information, the moving speed information, and the size and center information of the support part.

Optionally, according to the height of the photovoltaic module relative to the ground and the inclination angle of the photovoltaic module, the adjustment unit is controlled to adjust the height and inclination angle of the loading platform from the ground, so that the loading platform is aligned with the photovoltaic module, including:

According to the height of the photovoltaic module relative to the ground, control the first loading platform height adjustment rod and the second loading platform adjustment rod in the adjustment unit to adjust the height of the loading platform from the ground, so that the height of the loading platform from the ground is the same as the height of the photovoltaic module relative to the ground;

According to the inclination angle, control the loading platform angle adjustment rod in the adjustment unit to adjust the inclination angle of the loading platform, so that the inclination angle of the loading platform is the same as the inclination angle of the photovoltaic module.

Optionally, the method also includes:

Obtain the angle of the loading platform facing the photovoltaic module;

If the angle of the loading platform facing the photovoltaic module is not zero, then by adjusting the length of the first loading platform height adjustment rod or the second loading platform height adjustment rod in the adjustment unit, change the angle of the loading platform facing the photovoltaic module until the angle is zero.

Optionally, according to the preset angle of the photovoltaic module, adjust the angle of the loading platform to be the same as the preset angle of the photovoltaic module, including:

Obtain the actual angle of the photovoltaic module;

Obtain the current angle of the loading platform;

When the actual angle is different from the current angle, the inclination angle of the loading platform is changed through the loading platform angle adjustment rod installed at the tail of the adjustment unit until the adjusted angle of the loading platform is the same as the actual angle.

Optionally, establish a connecting track between the loading platform and the photovoltaic module, so that the cleaning robot deployed on the loading platform passes through the track to clean the photovoltaic module, including:

Control the shrinking track on the loading platform to extend towards the installation position of the photovoltaic module until the distance between the shrinking track and the photovoltaic module is within the preset distance range, so that the cleaning robot passes through the track onto the surface of the photovoltaic module.

Compared with the prior art, the present application has the following advantages:

The transport apparatus for a cleaning robot of a photovoltaic module provided by this application includes: a mobile unit, an adjustment unit, and a loading platform; the mobile unit is used to move according to the first moving trajectory, carry and automatically transport the adjustment unit, the loading platform and a cleaning robot to the parking position corresponding to the photovoltaic module; the adjustment unit is installed above the mobile unit and is used to adjust the height and inclination angle of the loading platform at the parking position, so that the loading platform is aligned with the photovoltaic module; the loading platform is arranged on the adjustment unit and is used to carry the cleaning robot; when the mobile unit moves to the parking position and the loading platform is aligned with the photovoltaic module, the cleaning robot can be moved from the loading platform to the photovoltaic module.

The mobile unit of the device can reach the position corresponding to each photovoltaic module according to the preset moving trajectory, and then adjusts the height and angle of the loading platform for deploying the cleaning robot through the adjustment unit, so that the loading platform is aligned with the photovoltaic module, so that cleaning robot moves from the loading platform onto the photovoltaic module and cleans the photovoltaic module. The device can automatically search for photovoltaic modules, automatically dock at the appropriate position of the photovoltaic modules, automatically move the cleaning robot to the photovoltaic modules, and automatically complete the cleaning of the photovoltaic modules. The overall process does not require human operation, control and monitoring, and does not require staff to place cleaning robots for each photovoltaic module separately, saving a lot of manpower and material resources. Moreover, cleaning work can be scheduled when the photovoltaic modules do not receive sunlight.

DETAILED DESCRIPTION

In the following description, numerous specific details are set forth in order to provide a thorough understanding of the application. However, the present application can be implemented in many other ways different from those described here, and those skilled in the art can make similar promotions without violating the connotation of the present application. Therefore, the present application is not limited by the specific embodiments disclosed below.

Figure 1A:
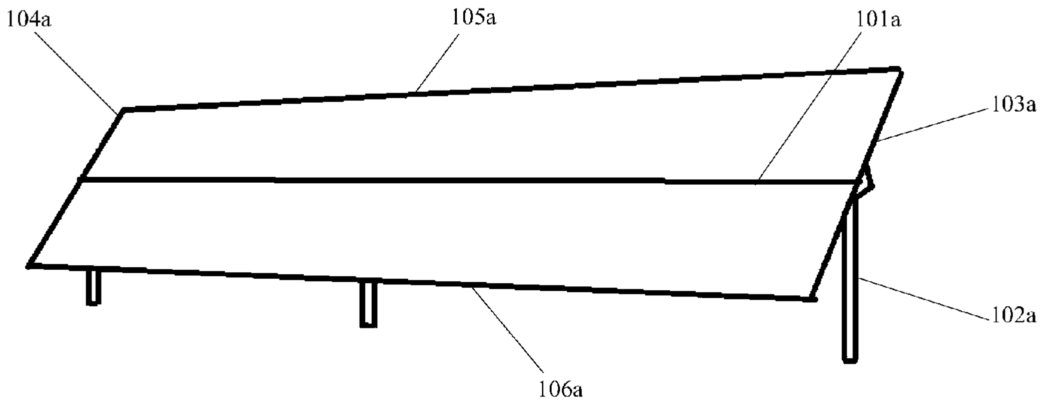
FIG. 1*a* is a schematic structural diagram of a photovoltaic module provided in the first embodiment of the present application.

In order to facilitate the understanding of this application, first introduce the photovoltaic module, and please refer to FIG. 1*a*, which is a schematic structural diagram of the photovoltaic module provided by the first embodiment of the application. The photovoltaic module is specifically a single flat-axis photovoltaic module with the model of SkySmartII. The photovoltaic module includes a torsion tube 101*a* parallel to the horizontal line, and a support part 102*a* fixed on the ground for supporting the photovoltaic module. Wherein, the support part 102*a* is perpendicular to the torsion tube 101*a,* and the torsion tube 101*a* faces due south and due north, so as to ensure that the photovoltaic module installed on the torsion tube faces due east and due west and rotates with the torsion tube 101*a* as an axis. As shown in FIG. 1*a*, the photovoltaic module includes four sides of a rectangular structure, which respectively are a first side 103*a* and a second side 104*a* parallel to each other, and a third side 105*a* and a fourth side 106*a* perpendicular to the first side 103*a* and the second side 104*a,* wherein the first side 103*a* and the second side 104*a* are short sides of the rectangle, and the third side 105*a* and the fourth side 106*a* are long sides.

Specifically, in a usage scenario, a tracker is installed on the photovoltaic module, and the tracker uses geographic latitude, longitude and time as main parameters, and uses a general astronomical algorithm to calculate the altitude and azimuth of the sun to control the photovoltaic panel of the photovoltaic module to rotate so that the photovoltaic module faces the direction of the sun. In a photovoltaic power field, several photovoltaic modules are arranged as shown in FIG. 1*a*, and there is a certain distance between each photovoltaic module. During the operation of the photovoltaic module, the sun tracker installed on the photovoltaic module tracks the position of the sun during the day and the photovoltaic panel on the photovoltaic module rotates according to the position of the sun to always face the sun, so as to maximize the collection of light energy.

When the photovoltaic module needs to be stopped, for example, when the photovoltaic module needs to be cleaned, the photovoltaic module stops rotating and maintains a fixed inclination angle $\alpha$. Wherein, the fixed inclination angle $\alpha$ can be set by the staff of the photovoltaic power station according to the actual situation.

Figure 2A:
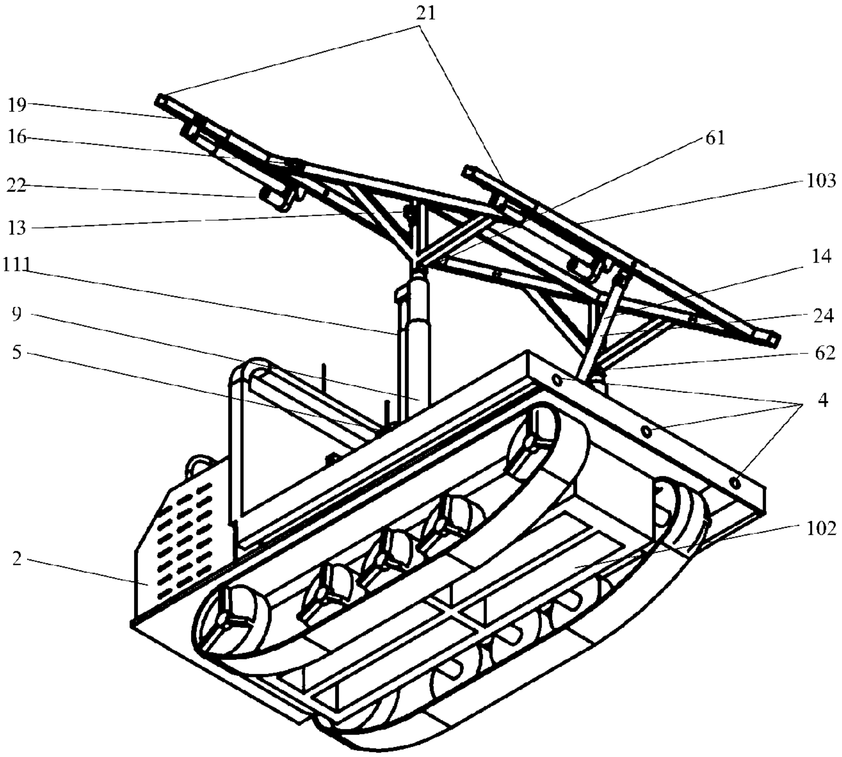
FIG. 2*a* is a perspective view of the transport apparatus for a cleaning robot of a photovoltaic module provided in the first embodiment of the present application.
Figure 2B:
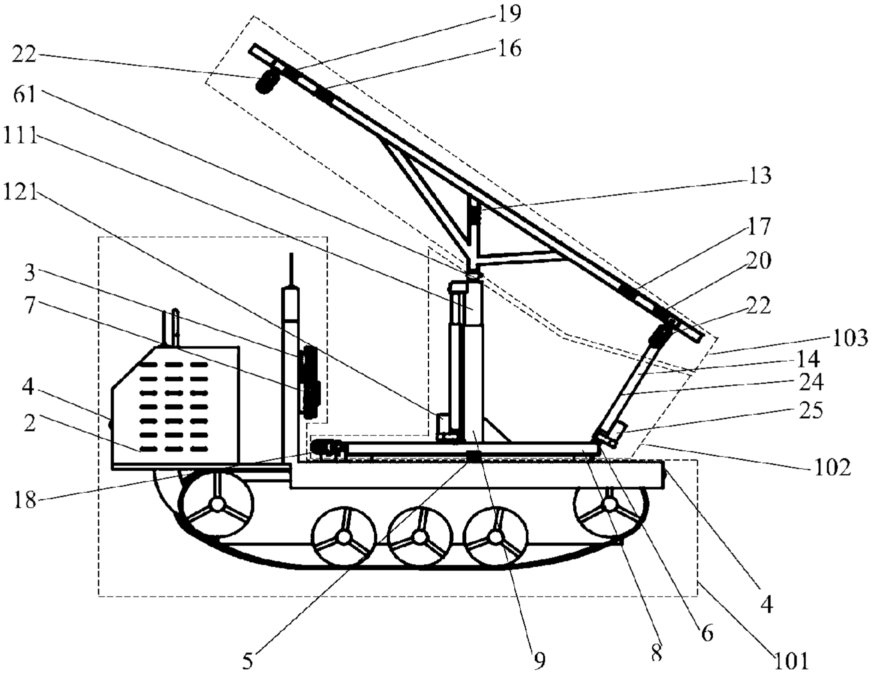
FIG. 2*b* is a side view of the transport apparatus for a cleaning robot of a photovoltaic module provided in the first embodiment of the present application.
Figure 2C:
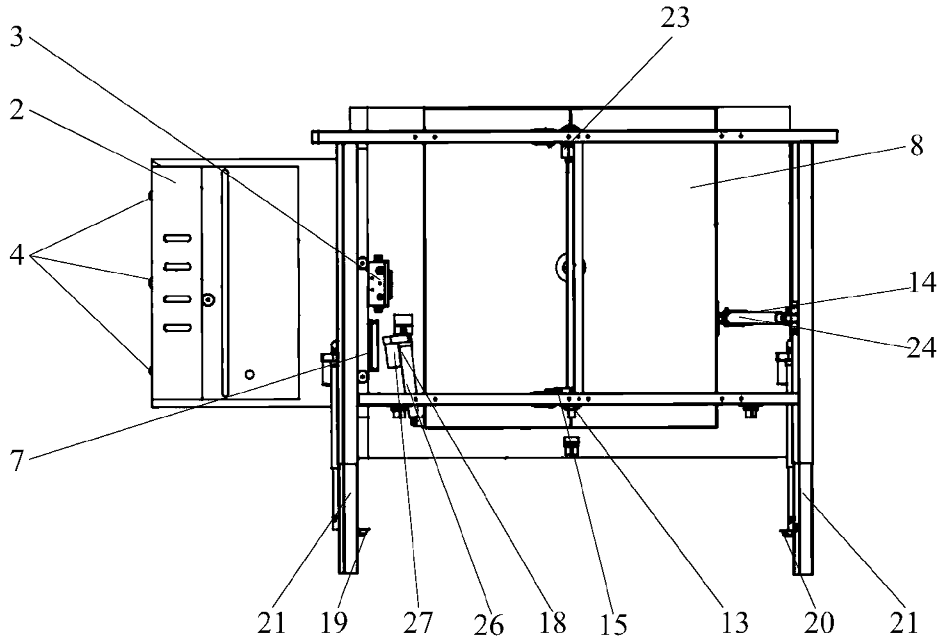
FIG. 2*c* is a top view of the transport apparatus for a cleaning robot of a photovoltaic module provided in the first embodiment of the present application.
Figure 2D:
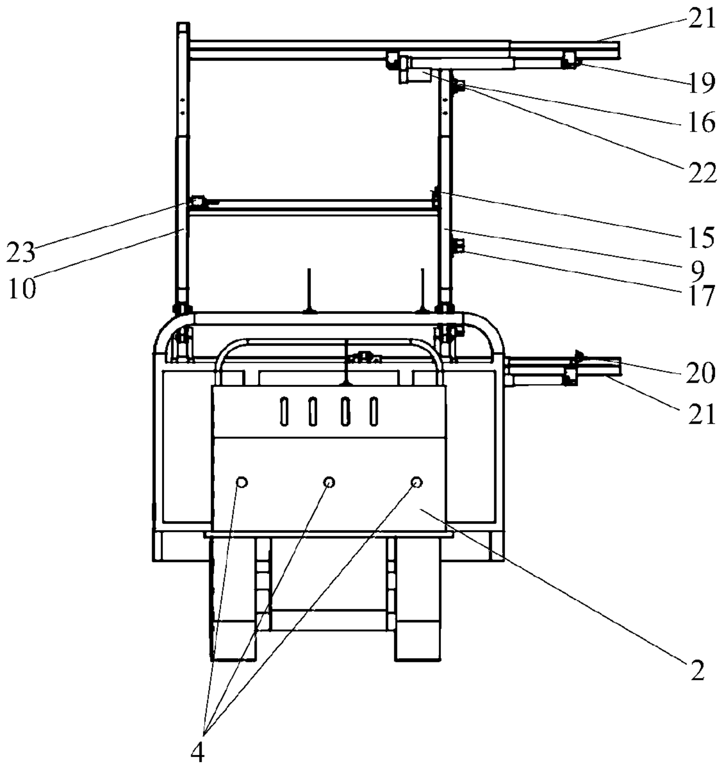
FIG. 2*d* is a front view of the transport apparatus for a cleaning robot of a photovoltaic module provided in the first embodiment of the present application.

Please refer to FIGS. 2*a*, 2*b*, 2*c*, and 2*d*, wherein FIG. 2*a* is a perspective view of the transport apparatus for a cleaning robot of a photovoltaic module provided in the first embodiment of the application; FIG. 2*b* is a side view of the transport apparatus for a cleaning robot of a photovoltaic module provided in the first embodiment of the application; FIG. 2*c* is a top view of the transport apparatus for a cleaning robot of a photovoltaic module provided in the first embodiment of the application; FIG. 2*d* is a front view of the transport apparatus for a cleaning robot of a photovoltaic module provided in the first embodiment of the application.

The transport apparatus for a cleaning robot of a photovoltaic module is mainly used in a photovoltaic power station to provide cleaning services for the photovoltaic modules in the photovoltaic power station. As shown in FIG. 2*b*, the transport apparatus for a cleaning robot of a photovoltaic module includes: a mobile unit 101, an adjustment unit 102, and a loading platform 103.

A cleaning robot is also deployed on the loading platform 103. When the loading platform 103 is aligned with the photovoltaic module, the loading platform moves to a short side of the photovoltaic module in order to move to the surface of the photovoltaic module for cleaning. In this embodiment, the photovoltaic module moves from the first side 103*a* to the surface of the photovoltaic module. It can be understood that the short side through which the cleaning robot enters the photovoltaic module is determined by the position of the transport apparatus for a cleaning robot of a photovoltaic module. Therefore, in some embodiments, the short side may also be the second side 104*a,* which is not limited here.

Wherein, the mobile unit 101 includes: a mobile crawler vehicle 2, a first controller 3, a first radar 4 and a first memory.

The first memory is used to acquire the first layout information of the photovoltaic modules; the first controller 3 is used to generate the first moving trajectory according to the first layout information.

The first layout information is sent by the photovoltaic power station system to the first memory. Specifically, the first layout information refers to the inclination angle (that is, the east-west inclination angle of the photovoltaic module), arrangement position information and/or arrangement view information of each photovoltaic module in the photovoltaic power station. Wherein, the first memory can be a memory stick or a hard disk inside the photovoltaic module cleaning robot.

In the specific application process, after the first memory receives the first layout information sent by the photovoltaic power station system, it stores the information and sends it to the first controller 3, and the first controller 3 uses the first layout information and its built-in planning parameters of the moving trajectory to generate the first moving trajectory of the mobile unit 101.

After the first memory receives the request information sent by the first controller 3 for retrieving the moving trajectory, it sends the information to the first controller 3 so that the first controller 3 controls the mobile crawler vehicle 2 to move to each photovoltaic module to be cleaned according to the preset moving trajectory.

In an optional embodiment of the present application, the first memory may also be an internal memory of the first controller 3. The first controller 3 can directly store the first layout information of the photovoltaic modules through the first memory, and generate the first moving trajectory according to the first layout information. There are no restrictions here.

In another optional embodiment of the present application, after receiving the first layout information, the first memory or the first controller 3 may also receive the second layout information of photovoltaic modules added on the basis of the first layout information, and update the first moving trajectory according to the first layout information and the second layout information, or according to the second layout information. For example, assuming that after the first controller 3 generates the first track information according to the first layout information, a new photovoltaic module is deployed in the photovoltaic power station, then the layout information of the newly deployed photovoltaic module can be obtained, and the layout information of the newly deployed photovoltaic module is combined with the first layout information to update the first track information. Another example: assuming that after the first controller 3 is deployed in a photovoltaic power station and obtains the first moving trajectory, the first controller 3 is redeployed in other photovoltaic power stations due to various reasons. At this time, the first memory can reacquire the layout information of the photovoltaic modules of the other photovoltaic power stations, and then updates the first moving trajectory according to the layout information of the photovoltaic modules of the other photovoltaic power stations and obtains the moving trajectory conforming to the layout information of the photovoltaic module of the inspired photovoltaic power station.

In the embodiment of the present application, the function of the mobile crawler vehicle 2 is to provide power for the mobile unit 101 and carry the adjustment unit 102, the loading platform 103, and the cleaning robot. In another optional embodiment of the present application, the mobile crawler vehicle 2 may be any wheeled vehicle with carrying function or other types of vehicles that provide moving kinetic energy for mobile unit 101. In this regard, this application does not make a limitation.

The first radars 4 are respectively installed on the outer sides of the mobile crawler vehicle 2, and the outer sides include: the front and the rear of the mobile crawler vehicle 2. Wherein, the front of the mobile crawler vehicle 2 faces the traveling direction, and the rear of the car faces the opposite direction of travel.

For ease of description, here, the first radar 4 installed on the front of the mobile crawler vehicle 2 is referred to as radar I, and the first radar 4 installed on the rear of the mobile crawler vehicle 2 is referred to as radar II. During the movement of the mobile crawler vehicle 2 according to the preset moving trajectory, the radar I and the radar II respectively detect the position of the obstacle on the moving trajectory which is close to the current traveling position of the mobile crawler vehicle 2, and simultaneously send the position of the obstacle to the first controller 3. After receiving the position of the obstacle, the first controller 3 controls the mobile crawler vehicle 2 to avoid the obstacle. It can be understood that controlling the mobile crawler vehicle 2 to avoid obstacles here refers to making the actual moving trajectory of the mobile crawler vehicle 2 avoid the obstacles.

A second radar 5 is installed in the middle position of the side of the mobile unit 101 facing the photovoltaic module. The second radar 5 is used to detect the support part of the photovoltaic module, obtain the distance information between the mobile unit 101 and the support part and send the distance information to the first controller 3, so that the first controller 3 controls the mobile crawler vehicle 2 to carry the cleaning robot to the parking position corresponding to the photovoltaic module.

In an optional embodiment of the present application, the photovoltaic module includes a support part as shown in FIG. 1*a*. For this type, the application detects the support part of the photovoltaic module and obtains the distance information between the mobile unit and the support part through the following steps S1-S4;

Step S1, obtain the moving speed information of the mobile unit 101.

Step S2, obtain the complete time length during which the support part is detected by the second radar 5.

Wherein, the complete time length during which the support part is detected by the second radar 5 refers to the time it takes from the support part appearing in the detection field of view of the second radar 5 to disappearing in the detection field of view of the second radar 5.

Step S3, according to the moving speed information of the mobile unit 101 and the complete time length, obtain the size and center information of the support part.

Specifically, the above step S3 refers to determining the size of the support part according to the distance equation composed of speed and time. Generally, the support part has a left-right symmetrical shape. After obtaining the size of the support part, naturally the center position of the support part can also be obtained.

Figure 3A:
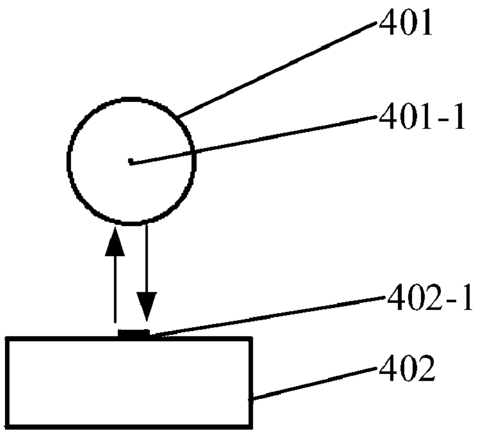
FIG. 3*a* is a schematic diagram of the support part of the second radar detection provided by the first embodiment of the present application.

Please refer to FIG. 3*a*, which is a schematic diagram of the second radar 5 detecting the support part provided in the first embodiment of the present application.

FIG. 3*a* includes a support part 401 and a transport apparatus 402 for a cleaning robot of a photovoltaic module, wherein the support part 401 is a cylinder. The support part 401 shown in FIG. 3*a* is a top view of the cross section of the support part of the photovoltaic module. The support part 401 includes a center 401-1 of the support part at the center of the circle.

The transport apparatus 402 for a cleaning robot of a photovoltaic module includes a second radar 402-1 located at the center of the side of the transport apparatus.

In practical application, the second radar 402-1 shown in FIG. 3*a* continuously sends radio waves to the direction of the photovoltaic module. When the position of the second radar 402-1 faces the support part, the radio waves will be reflected to the location of the second radar. When the second radar 402-1 detects the returning signal for the first time, it is considered that the support part enters the detection field of view of the second radar 402-1 at this time. As the transport apparatus advances, the transport apparatus gradually moves away from the support part 401. When the second radar 402-1 detects the returning signal for the last time, it is considered that the second radar 402-1 of the transport apparatus is no longer facing the support part 401 at this time. The time taken for the above process is the complete time length.

Next, a method for calculating the center position of the support part is given. Assuming that the complete time length is 1 S and the moving speed of the transport apparatus is 0.1 m/s, then the size of the support part (that is, the diameter of the support part) is 0.1 m. The center position of the support part is the position corresponding to the position of 0.05 meters forward from the position where the first radar 402-1 detects the returned signal for the first time, that is, the position corresponding to 401-1 in FIG. 3*a*.

Step S4, obtain the time information of the mobile unit 101 traveling in the direction of the moving trajectory during the detection process, and obtain the distance information between the mobile unit and the support part according to the time information, the moving speed information, and the size and center information of the support part. In an ideal situation, in the detection field of view of the second radar 5, if the support part disappears, the mobile unit 101 will stop immediately, that is to say, at this moment, the second radar 5 is facing an edge position of the support part. At this time, the first controller 3 only needs to control the mobile unit 101 to retract half the size of the support part to reach the parking position.

But in general, even if the support part disappears in the detection field of view of the second radar 5, the mobile unit will not stop immediately. At this time, it is not only necessary to obtain the moving speed information and the size and center information of the support part, but also necessary to further obtain the moving distance of the mobile unit 101 after the support part disappears from the detection field of view of the second radar 5, so that the first controller 3 can control the mobile unit 101 to retreat to the center of the support part, that is, the parking position.

Further, in order to ensure that the first controller 3 can more accurately determine the center position of the column supporting the photovoltaic module, the above process may be repeated several times. In addition, considering that there may be multiple support parts for supporting the photovoltaic module, another optional embodiment of the present application takes two support parts as an example to describe the process of detecting the support part of the photovoltaic module and obtaining the distance information between the mobile unit and the support.

Figure 1B:
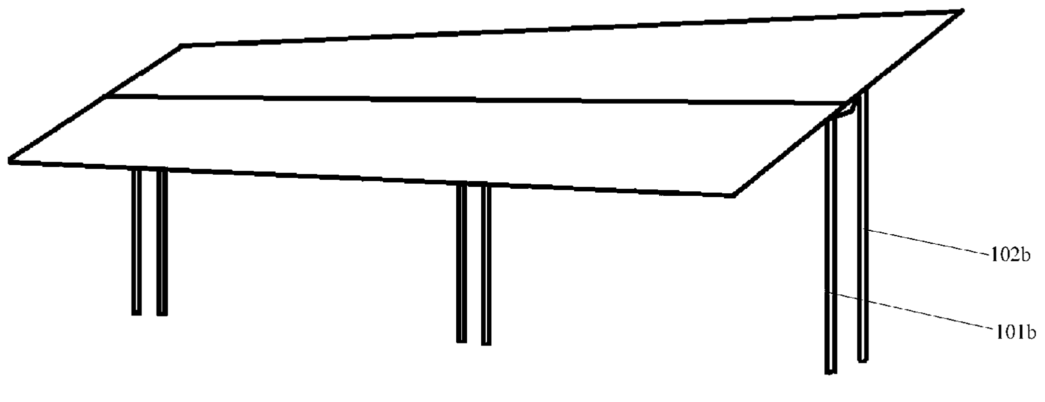
FIG. 1*b* is a schematic structural diagram of another photovoltaic module provided in the first embodiment of the present application.

Please refer to FIG. 1*b*, which is a schematic structural diagram of another photovoltaic module provided in the first embodiment of the present application. Different from FIG. 1*a*, FIG. 1*b* includes two support parts, namely the first support part 101*b* and the second support part 102*b,* which are symmetrically installed on both sides of the center position of the photovoltaic module.

Specifically, the process of detecting the support part of the photovoltaic module and obtaining the distance information between the mobile unit and the support part includes the following steps S5-S8. It should be noted that there is no sequential connection between steps S5-S8 and steps S1-S4.

Step S5, obtain the moving speed information of the mobile unit 101.

Step S6, obtain the complete time length from the detection of the first support part 101*b* to the disappearance of the second support part 102*b* in the detection field of view.

Figure 3B:
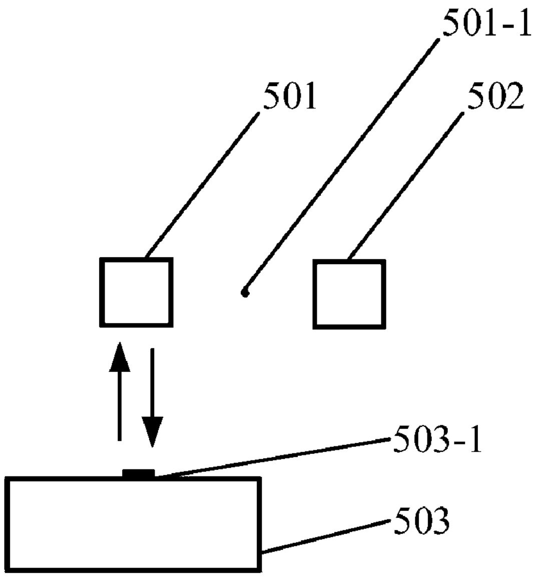
FIG. 3*b* is a schematic diagram of the support part of another second radar detection provided by the first embodiment of the present application.

Please refer to FIG. 3*b*, which is a schematic diagram of another second radar detection support part provided in the first embodiment of the present application.

FIG. 3*b* includes: a first support part 501, a second support part 502, and a transport apparatus 503 of the photovoltaic module cleaning robot. Both the first support part 501 and the second support part 502 are cuboid.

The first support part 501 and the second support part 502 shown in FIG. 3*b* are cross-sectional top views of the support part of the photovoltaic module, and the center positions of the first support part 501 and the second support part 502 include the center 501-1 of the support part; the side center position of the transport apparatus 503 includes the second detection radar 503-1.

The specific manner of obtaining the center 501-1 of the support part is similar to the manner shown in the above steps S1-S3, and will not be repeated here.

Step S7, obtain the position information of the first support part 501 and the second support part 502 according to the moving speed information of the mobile unit 101 and the complete time length.

Step S8, obtain the time information of the mobile unit 101 traveling in the direction of the moving trajectory during the detection process, and obtain the position information of the mobile unit 101 and the center 501-1 between the first support part 501 and the second support part 502 according to the time information, the moving speed information, and the position information of the first and second support parts, so that the mobile unit can reach the parking position and the photovoltaic module cleaning unit can move to the surface of the photovoltaic module and start cleaning.

Above, the process of the mobile unit 101 reaching the parking position has been specifically introduced. After the mobile unit 101 reaches the parking position, it is also necessary to adjust the height, inclination angle and direction of the loading platform 103 through the adjustment unit 102 installed on the top of the mobile unit 101 so that the loading platform 103 is aligned with the photovoltaic module. Specifically, the above-mentioned control commands for adjusting the height, angle and direction of the loading platform 103 are issued by the second controller 7.

Figure 5A:
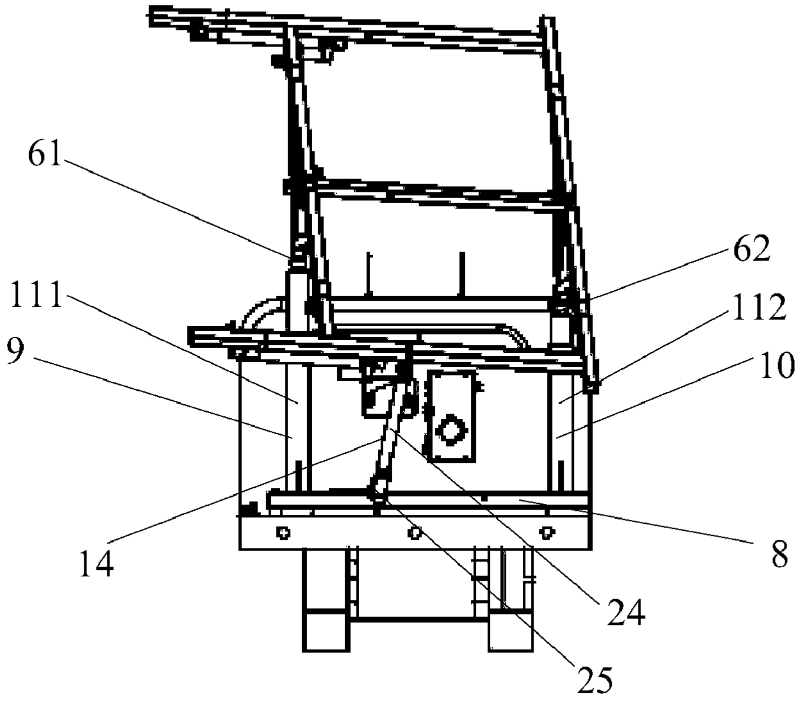
FIG. 5*a* is a rear view of the photovoltaic module cleaning robot after adjusting the inclination angles between the north and south sides of the loading platform and the horizontal plane to be parallel to each other when the transport apparatus for a cleaning robot of a photovoltaic module is on an inclined road provided by the first embodiment of the present application.
Figure 5B:
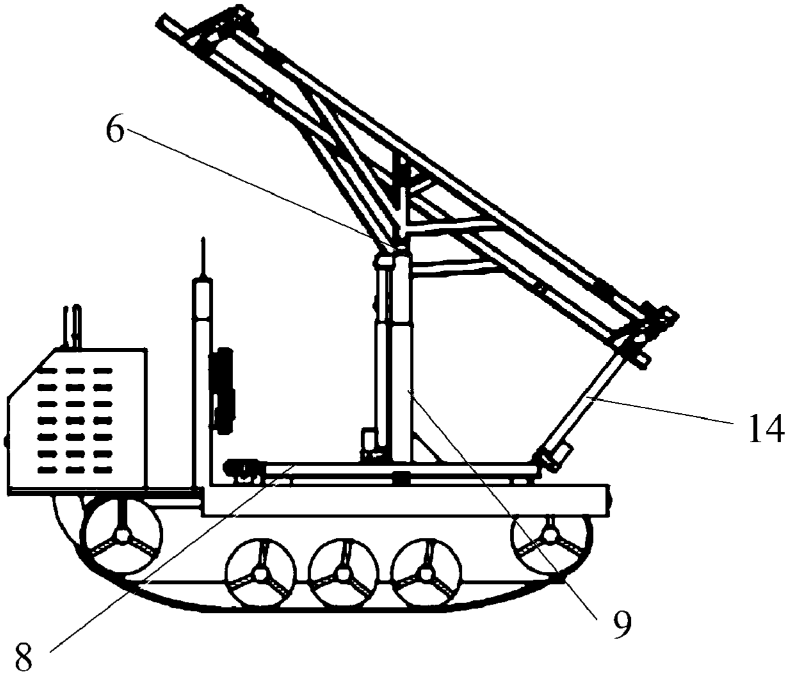
FIG. 5*b* is a side view of the photovoltaic module cleaning robot after adjusting the inclination angles between the north and south sides of the loading platform and the horizontal plane to be parallel to each other when the transport apparatus for a cleaning robot of a photovoltaic module is on an inclined road surface provided by the first embodiment of the present application.
Figure 5C:
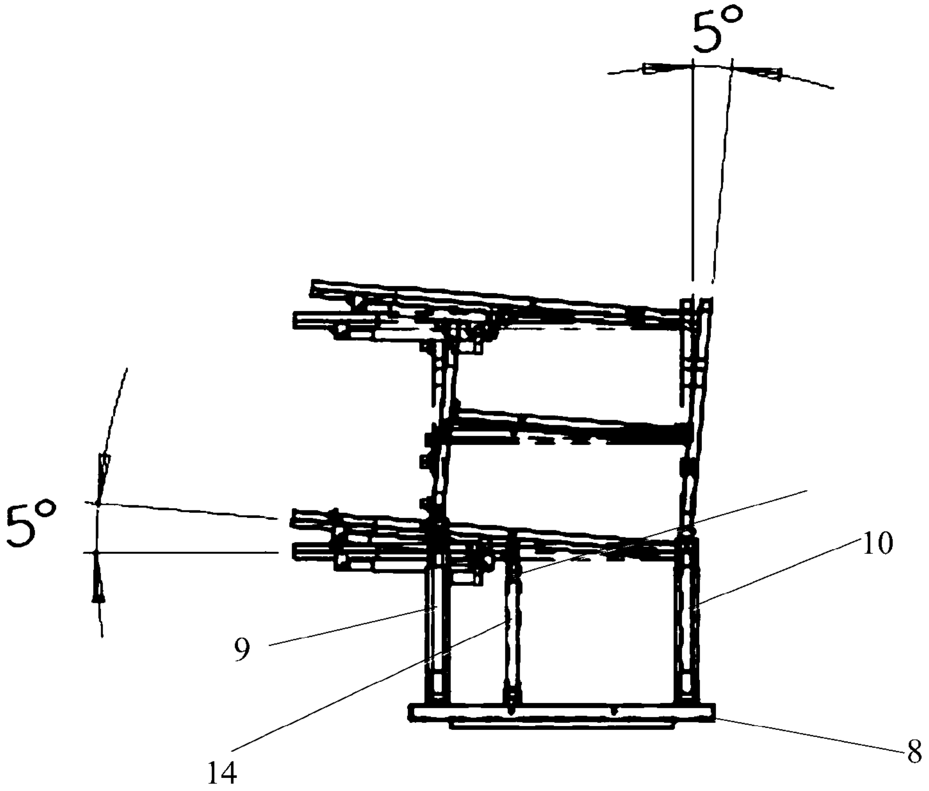
FIG. 5*c* is a schematic diagram of the dynamic change of adjusting the loading platform from being north-to-south inclined to being parallel to the horizontal plane when the transport apparatus for a cleaning robot of a photovoltaic module is on an inclined road provided by the first embodiment of the present application.

In an optional embodiment of the present application, as shown in FIGS. 5*a*, 5*b* and 5*c*, the adjustment unit 102 includes: a support plate 8, a first loading platform height adjustment rod 9, and a second loading platform height adjustment rod 10.

Wherein, the first loading platform height adjustment rod 9 and the second loading platform height adjustment rod 10 are respectively installed vertically at the center positions of the first and second edges of the support plate 8. The first loading platform adjustment rod 9 is installed on the center position of the first edge of the support plate 8 facing the photovoltaic module, and the second loading platform adjustment rod 10 is installed on the center position of the second edge of the support plate 8 away from the photovoltaic module.

The tops of the first loading platform height adjustment rod 9 and the second loading platform height adjustment rod 10 are connected with the loading platform 103 respectively. In the specific application process, the first loading platform height adjustment rod 9 and the second loading platform height adjustment rod 10 are used to adjust the overall height of the loading platform 103 and the inclination angle between the north and south sides of the loading platform 103 and the horizontal plane.

Specifically, the first loading platform height adjustment rod 9 includes: a first telescopic rod 111, a first motor 121. The second loading platform height adjustment rod 10 includes: a second telescopic rod 112 and a second motor 122.

Wherein, the two ends of the first telescopic rod 111 are respectively connected to the support plate 8 and the loading platform. Specifically, one end of the first telescopic rod 111 is fixedly connected to the upper surface of the support plate, and the other end is connected to the loading platform 103 through a universal bearing 61. The two ends of the second telescopic rod 112 are respectively connected with the support plate 8 and the loading platform. Specifically, one end of the second telescopic rod 112 is fixedly connected to the upper surface of the support plate, and the other end is connected to the loading platform 103 through another universal bearing 62.

Figure 4A:
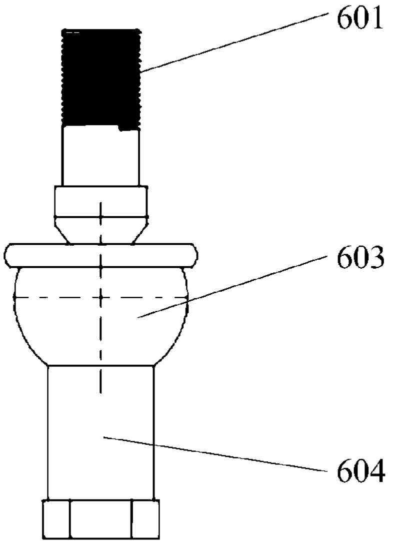
FIG. 4*a* is a schematic diagram of the overall structure of the universal bearing provided in the first embodiment of the present application.
Figure 4B:
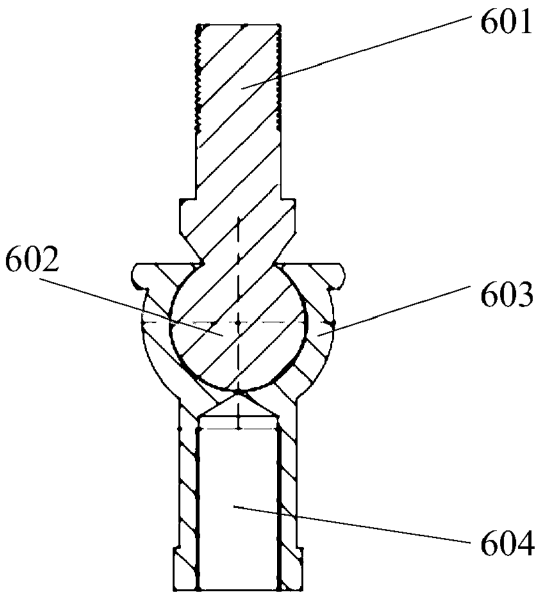
FIG. 4*b* is a schematic cross-sectional structure diagram of the Vientiane bearing provided in the first embodiment of the present application.

Please refer to FIG. 4*a* and FIG. 4*b*, wherein FIG. 4*a* is a schematic diagram of the overall structure of the universal bearing provided in the first embodiment of the present application, and FIG. 4*b* is a schematic cross-sectional structural diagram of the universal bearing provided in the first embodiment of the present application.

Universal bearing 61 includes: a first head 601, a universal ball 602, a universal ball rotating cavity 603, and a second head 604;

Wherein, one end of the first head 601 is provided with a thread, and after matching with the screw hole of the loading platform 103, a threaded connection is formed, and the other end of the first head 601 is connected with the universal ball 602;

One end of the universal ball rotating cavity 603 is provided with a circular opening, and the universal ball 602 is installed inside the universal ball rotating cavity 603 through the opening, and the outer surface of the universal ball 602 and the inner surface of the universal ball accommodating cavity contact, wherein the diameter of the circular opening is smaller than the diameter of the universal ball 602 to prevent the universal ball 602 from falling off; the other end of the universal ball rotating cavity 603 is connected to one end of the second head 604;

The other end of the second head 604 is provided with a thread structure for installing the universal bearing 61 on the first telescopic rod 111.

The structure of the universal bearing 62 is the same as that of the universal bearing 61. One end is connected to the loading platform with threads, and the other end is fixedly connected to the second telescopic rod 112.

Further, the first motor 121 is fixed on one end of the first telescopic rod 111, and is used to drive the first telescopic rod 111 to extend and shorten, so as to adjust the overall height of the loading platform 103, or adjust the angle of the loading platform 103 between the north and south sides and the horizontal plane. The second motor 122 is fixed on one end of the second telescopic rod 112, and is used to drive the second telescopic rod 112 to extend and shorten, so as to adjust the overall height of the loading platform 103, or adjust the angle of the loading platform 103 between the north and south sides and the horizontal plane.

In order to ensure that the first motor 121 and the second motor 122 can drive the first telescopic rod 111 and the second telescopic rod 112 to move the loading platform to the same height as the photovoltaic module. A third radar 13 is also installed at the center of the loading platform 103.

The third radar 13 is used to detect the height of the photovoltaic module relative to the ground, and send the height of the photovoltaic module relative to the ground to the second controller 7.

After receiving the installation height of the photovoltaic module, the second controller 7 sends the drive signal to the first motor 121 and the second motor 122 to extend or shorten the first telescopic rod 111 and the second telescopic rod 111 according to the height of the photovoltaic module relative to the ground. After receiving the drive signal, first motor 121 and second motor 122 drive the first telescopic rod 111 of the first loading platform height adjustment rod 9 and the second telescopic rod 112 of the second loading platform height adjustment rod 10 to extend or shorten at the same time, so as to change the height of the loading platform 103 from the ground until the height of the loading platform 103 from the ground is the same as the height of the photovoltaic module relative to the ground.

It should be noted that, in an optional embodiment of the present application, the height of the photovoltaic module from the ground is relative to the ground horizontal level, and similarly, the overall height of the loading platform is also relative to the ground horizontal level.

In the process of specific application, after the transport apparatus for a cleaning robot of a photovoltaic module reaches the cleaning position corresponding to the photovoltaic module, the mobile crawler vehicle 2 may be on an uneven road surface, and at this time, the loading platform 103 may also be inclined accordingly. At this time, the loading platform 103 is also adjusted through the first loading platform height adjustment rod 9 and the second loading platform height adjustment rod 10.

Specifically, as shown in FIG. 2*d*, the loading platform 103 is also equipped with a first goniometer 23, and the first goniometer 23 is used to measure the inclination angle between the north and south sides of the loading platform 103 and the horizontal plane (that is, the inclination angle of the loading platform 103 facing the installation position of the photovoltaic module), and send the inclination angle to the second controller 7. When the angle measured by the first goniometer 23 is zero, it means that the loading platform 103 is not tilted towards the direction of the photovoltaic module; when the angle measured by the first goniometer 23 is not zero, it means that the loading platform 103 is tilted towards the direction of the photovoltaic module.

At this time, the second controller 7 adjusts the height of one side of the loading platform by controlling any one of the first loading platform height adjustment rod 9 and the second loading platform height adjustment rod 10 to rise or fall until the two sides of the loading platform are at the same height, that is, until the angle measured by the first goniometer 23 is zero.

After it is determined that the height of the loading platform is the same as the installation height of the photovoltaic modules, it is also necessary to ensure that the angle of the loading platform 103 is the same as that of the photovoltaic modules.

Each goniometer disclosed in this application can adopt Witte intelligent gyroscope angle sensor. Witte intelligent angle sensor obtains the current angle information through the calculation of software algorithm on the measurement data of accelerometer, gyroscope, magnetometer and so on. The sensors cover a series of sensors such as single-axis, 3-axis, 6-axis, 9-axis, 10-axis, and GPS inertial navigation. There are two ways to solve the angle, one is obtained through the accelerometer, and the other is obtained through the gyroscope.

The acceleration solution is obtained through the relationship of trigonometric functions of the acceleration components of each axis. This calculation is based on the fact that the acceleration is equal to the acceleration of gravity, that is, when the object is not moving. If the object moves, the measured value of the acceleration is not only the acceleration of gravity, but also the acceleration of the object's motion.

The gyroscope solution is to obtain the angle by integrating the gyroscope. The rotational angular velocity of the sensor can be directly measured by the gyroscope, and the angle can be obtained by numerical integration. The gyroscope itself has high precision, and the measurement of rotation is not affected by the angular velocity of the object's movement and has nothing to do with the installation position of the sensor, as long as the sensor and the object to be measured are fixedly connected.

In order to facilitate the understanding of the above-mentioned process of the loading platform 103 changing from the east-west inclined state to the east-west parallel state, the process will be introduced below with reference to FIG. 5*a*, FIG. 5*b* and FIG. 5*c*.

Among them, FIG. 5*a* is a rear view of the photovoltaic module cleaning robot after adjusting the inclination angles between the east and west sides of the loading platform and the horizontal plane to be parallel to each other when the transport apparatus for a cleaning robot of a photovoltaic module is on an inclined road;

FIG. 5*b* is a side view of the photovoltaic module cleaning robot after adjusting the inclination angles between the east and west sides of the loading platform and the horizontal plane to be parallel to each other when the transport apparatus for a cleaning robot of a photovoltaic module is on an inclined road;

FIG. 5*c* is a schematic diagram of the dynamic change of adjusting the loading platform from being east-to-west inclined to being parallel to the horizontal plane when the transport apparatus for a cleaning robot of a photovoltaic module is on an inclined road.

As shown in FIG. 5*a*, it is assumed that the left side of the transport apparatus for a cleaning robot of a photovoltaic module faces west, and the right side faces east; and at this time, the ground is higher in the west and lower in the east. And the first loading platform height adjustment rod 9 is located on the left side of the support plate 8; the second loading platform height adjustment rod 10 is located on the right side of the support plate 8. At this time, it is necessary to adjust the first loading platform height adjustment rod 9 located on the left side of the photovoltaic module cleaning robot to shrink until the angle between the east and west sides of the loading platform 103 is parallel to the horizontal plane, that is, in the state shown in FIG. 5*c*, the state is adjusted from the non-horizontal state as a solid line to the horizontal state as a dotted line.

Concretely, in the process that the first loading platform height adjustment rod 9 is raised, the universal bearing 61 that is used to connect the first loading platform height adjustment rod 9 and the loading platform 103 rotates thereupon, and likewise, the universal bearing 62 that is used to connect the second loading platform height adjustment rod 10 and the loading platform 103 also rotates accordingly, so as to adjust the angle between the loading platform and the ground.

In addition, in view of the fact that in most photovoltaic power stations, the road surface for deploying photovoltaic modules is relatively flat, therefore, the angle adjustment range for adjusting the east-west inclination angle of the loading platform 103 is between ±5°. Further, in order to realize the alignment of the loading platform 103 and the photovoltaic module, the north-south inclination angle of the loading platform 103 also needs to be adjusted. As shown in FIGS. 5*a* and 5*b*, the adjustment unit 102 further includes: a loading platform angle adjustment rod 14. One side of the loading platform angle adjustment rod 14 is movably connected with the tail of the support plate 8, and the other side is movably connected with the tail of the loading platform 103. In an optional embodiment of the application, the loading platform angle adjustment rod 14 can also be connected with the tail of the support plate 8 and the tail of the loading platform 103 through universal bearings as shown in FIG. 4*a* and FIG. 4*b*.

Specifically, the loading platform angle adjustment rod 14 is also connected to the support plate 8 through a universal bearing; likewise, loading platform angle adjustment rod 14 is also connected with the loading platform by a universal bearing.

In an optional embodiment of the present application, the angle of the photovoltaic module is preset and stored in the second controller 7. The loading platform 103 is also provided with a second goniometer 15, and the second goniometer 15 is used to measure the inclination angle of the loading platform 103 along the traveling direction of the mobile unit 101, and send the inclination angle to the second controller 7.

After the second controller 7 obtains the inclination angle measured by the second goniometer 15, it determines whether the inclination angle is the same as the preset angle of the photovoltaic module. If they are not the same, the second controller 7 drives the tail of the loading platform 103 to rise or fall by controlling the angle adjustment 7 of the loading platform until the angle measured by the second goniometer 15 is the same as the preset angle of the photovoltaic module.

Specifically, as shown in FIGS. 2*a* and 2*b*, the loading platform angle adjustment rod 14 includes: a third telescopic rod 24 and a third motor 25.

Wherein, the two ends of the third telescopic rod 24 are respectively connected with the support plate 8 and the end of the loading platform opposite to the moving direction; the third motor 25 is fixed at one end of the third telescopic rod 24 and drives the third telescopic rod 24.

When the second controller 7 judges that the inclination angle of the loading platform 103 obtained by the second goniometer 15 is different from the inclination angle of the photovoltaic module, it sends a control command to the third motor 25 to drive the third telescopic rod 24 to rise or fall. According to the control command, the third motor 25 controls the third telescopic rod 24 to extend or shorten to adjust the inclination angle of the loading platform 103 until the inclination angle of the loading platform 103 is the same as the inclination angle of the photovoltaic module. As shown in FIGS. 2*b* and 2*d*, in order to more accurately ensure that the preset angle of the photovoltaic module is the same as that of the loading platform 103, a fourth radar 16 and a fifth radar 17 are installed on the side of the loading platform facing the installation position of the photovoltaic module.

The fourth radar 16 and the fifth radar 17 are respectively installed on both sides of the central edge of the loading platform 103.

The fourth radar 16 and the fifth radar 17 are used to detect the edge of the photovoltaic module, and send the detection results to the second controller 7.

The second controller 7 receives the detection results of the fourth radar 16 and the fifth radar 17. If the fourth radar 16 and the fifth radar 17 do not detect the edge of the photovoltaic module at the same time, the second controller 7 considers that the inclination angle of the photovoltaic module is different from the inclination angle of the loading platform 103. In this case, the second controller 7 controls the loading platform angle adjustment rod 14 to continue to push the tail of the loading platform 103 to rise or fall until the first photovoltaic module edge detection radar 16 and the second photovoltaic module edge detection radar 17 simultaneously detect the edge of the photovoltaic module.

Figure 6:
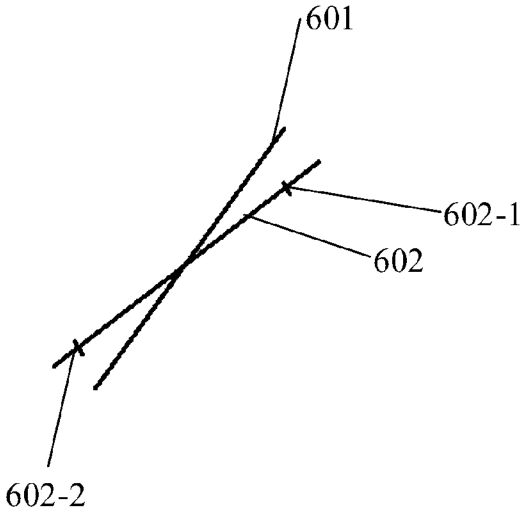
FIG. 6 is a schematic diagram of adjusting the inclination angle of the photovoltaic module through the fourth radar and the fifth radar provided by the first embodiment of the present application.

As shown in FIG. 6, it is a schematic diagram of adjusting the inclination angle of the photovoltaic module through the fourth radar and the fifth radar provided by the first embodiment of the present application.

FIG. 6 includes a side view of a photovoltaic module 601 and a loading platform 602. The loading platform 602 includes: the fourth radar 602-1 and the fifth radar 602-2, wherein, the fourth detection radar 602-1 and the fifth detection radar 602-2.

In FIG. 6, the photovoltaic module 601 and the loading platform 602 are at the same height but not parallel. At this time, the fourth radar 602-1 and the fifth radar do not simultaneously detect the edge of the photovoltaic module 601, and the angle of the loading platform needs to be adjusted, until the loading platform 602 is parallel to the photovoltaic module 601, that is, until the photovoltaic module 601 and the loading platform 602 are in a state of overlapping in a side view.

After determining the height and angle of the loading platform 103, it is also necessary to ensure that the departure side of the cleaning robot on the loading platform 103 faces the photovoltaic module.

As shown in FIGS. 2*b*, 2*c* and 2*d*, in order to make the departure side of the cleaning robot on the loading platform 103 face the photovoltaic module, a loading platform direction adjustment rod 18 is connected between the support plate 8 of the adjustment unit 102 and the mobile crawler vehicle 2.

A first distance sensor 19 and a second distance sensor 20 are installed on the side of the loading platform 103 facing the photovoltaic module.

The first distance sensor 19 and the second distance sensor 20 are respectively installed on both sides of the central edge position of the loading platform 103.

The first distance sensor 19 is used to detect the first distance between the installation position of the first distance sensor 19 on the loading platform and the edge of the photovoltaic module, and send the first distance to the second controller 7; similarly, the second distance sensor 20 is used to detect the second distance between the second distance sensor 20 and the edge of the photovoltaic module, and send the second distance to the second controller 7.

The second controller 7 compares the first distance and the second distance sent by the first distance sensor 19 and the second distance sensor 20. If the first distance and the second distance are different, it is considered that the direction of the departure side of the cleaning robot on the loading platform 103 needs to be corrected. At this time, the second controller 7 controls the extending and shortening of the loading platform direction adjustment rod 18 to push the support plate 8 of the adjustment unit 102 to drive the loading platform 103 to rotate, so as to adjust the direction of the loading platform 103 until the first distance is the same as the second distance.

Specifically, the loading platform direction adjustment rod 18 is a linear actuator, including: a fourth telescopic rod 26 and a fourth motor 27.

The loading platform 103, the support plate 8 and the mobile unit 101 are rotatably connected through a rotary support shaft 70.

Figure 11A:
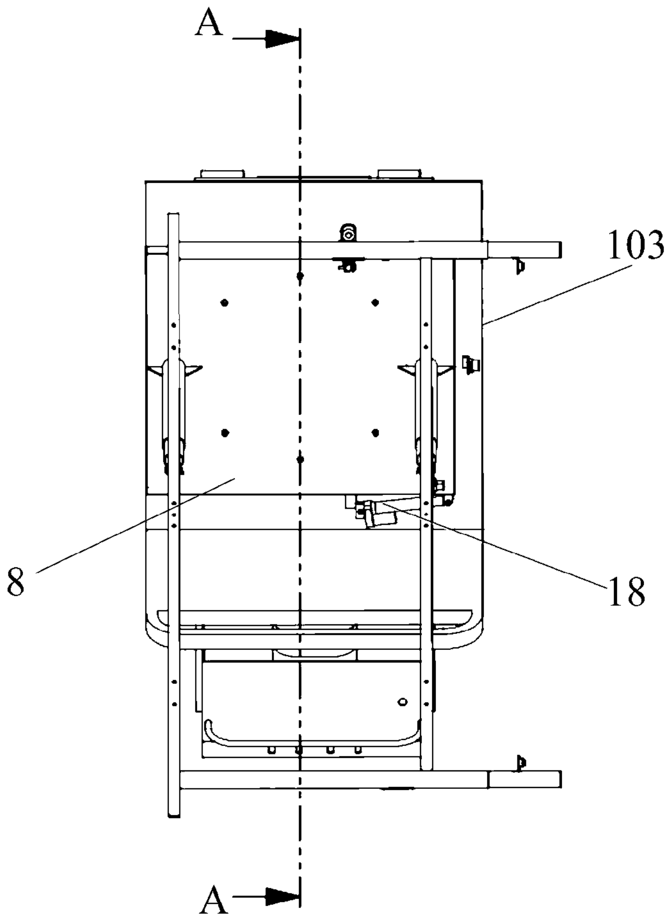
FIG. 11*a* is a schematic side cross-sectional view of the transport apparatus for a cleaning robot of a photovoltaic module provided in the first embodiment of the present application.
Figure 11B:
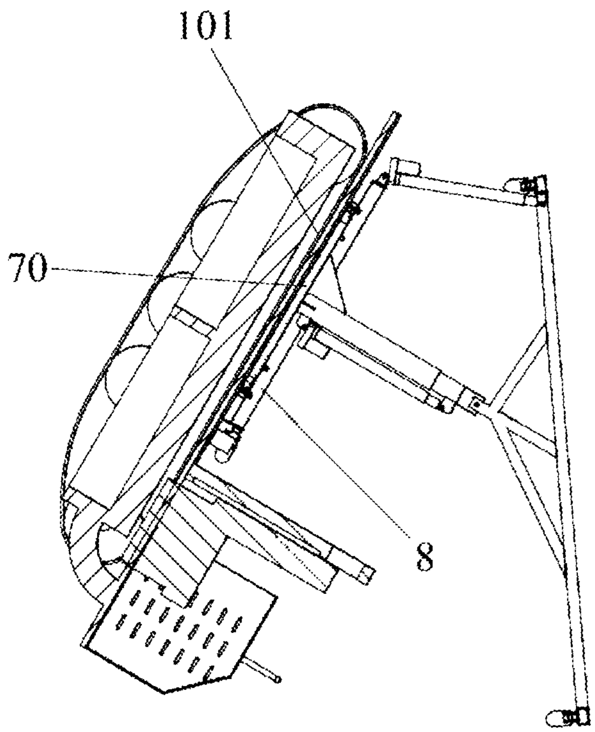
FIG. 11*b* is a schematic side sectional view of the transport apparatus for a cleaning robot of a photovoltaic module provided in the first embodiment of the present application.

Please refer to FIG. 11*a* and FIG. 11*b*, which show the position of the rotary support shaft 70 between the support plate 8 and the mobile unit 101. Among them, FIG. 11*b* is a schematic side sectional view of the transport apparatus for a cleaning robot of a photovoltaic module provided in the first embodiment of the application; FIG. 11*a* is a schematic side cross-sectional view of the transport apparatus for a cleaning robot of a photovoltaic module provided in the first embodiment of the application.

As shown in FIG. 11*a*, the cross-sectional view shown in FIG. 11*b* can be obtained by taking A-A marked in FIG. 11*a* as a section.

In FIG. 11 *b*, a rotary support shaft 70 installed between the support plate 8 and the mobile unit 101 is included.

Figure 11C:
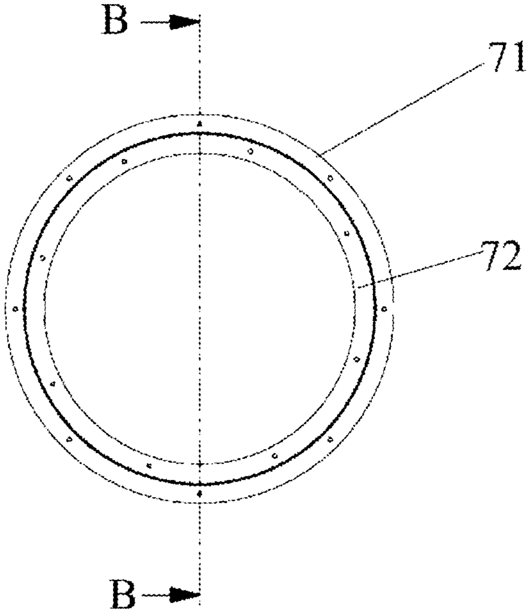
FIG. 11*c* is a schematic structural diagram of the rotary support shaft provided by the first embodiment of the present application.
Figure 11D:
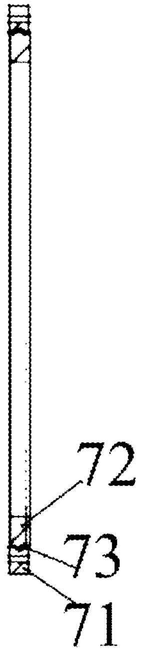
FIG. 11*d* is a schematic cross-sectional view of the swivel support shaft provided in the first embodiment of the present application.

Further, please refer to FIG. 11*c* and FIG. 11*d*, wherein FIG. 11*c* is a schematic structural diagram of the rotary support shaft provided by the first embodiment of the present application; FIG. 11*d* is a schematic cross-sectional view of the rotary support shaft provided by the first embodiment of the present application. FIG. 11*d* is obtained along the section point B-B of the rotary support shaft shown in FIG. 11*c*.

The rotary support shaft 70 includes: a first rotating ring 71 and a second rotating ring 72, and the first rotating ring 71 and the second rotating ring 72 form a concentric ring. The diameter of the first rotating ring 71 is greater than that of the second rotating ring 72, and the first rotating ring 71 and the second rotating ring 72 are connected by several needle rollers 73 of the same size.

One of the first rotating ring 71 and the second rotating ring 72 is fixed on the center of the support plate 8, and the other is fixed on the upper surface of the mobile unit 101.

When the second controller 7 judges that the first distance is not the same as the second distance, the fourth telescopic rod 26 is driven to be extended or shortened by controlling the fourth motor 27. At this time, the first rotating ring 71 and the second rotating ring 72 installed between the support plate 8 and the mobile unit 101 perform relative motion around their common center of circle, thereby driving the loading platform 103 to rotate, so that the first distance and the second distance are the same, which completes the adjustment of the orientation of the loading platform 103, so that the side of the loading platform facing the photovoltaic module directly faces the photovoltaic module.

After the height, inclination angle and direction of the loading platform are determined to correspond to the photovoltaic module, it is also necessary to build a connecting channel between the loading platform and the photovoltaic module, so that the cleaning robot carried by the loading platform can enter the photovoltaic module through this channel to complete the cleaning work.

Figure 7A:
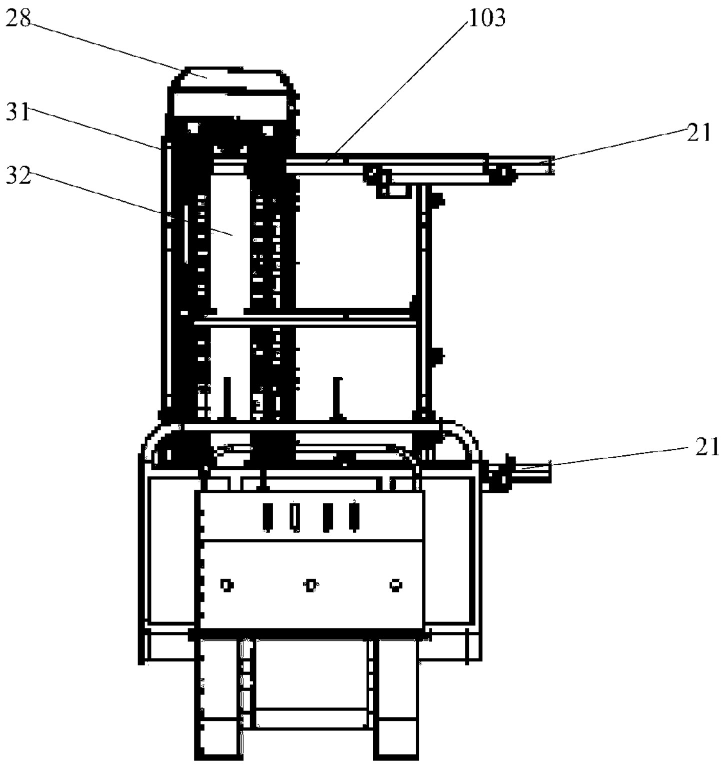
FIG. 7*a* is a front view of the transport apparatus for a cleaning robot of a photovoltaic module after the cleaning robot provided by the first embodiment of the present application is deployed on the loading platform.
Figure 7B:
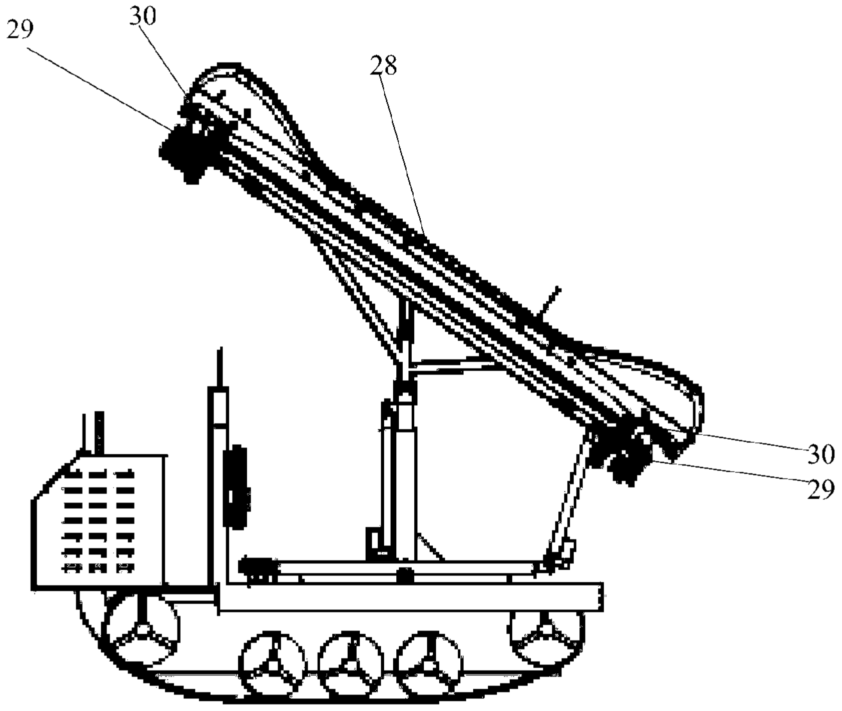
FIG. 7*b* is a side view of the transport apparatus for a cleaning robot of a photovoltaic module after the cleaning robot provided by the first embodiment of the present application is deployed on the loading platform.
Figure 7C:
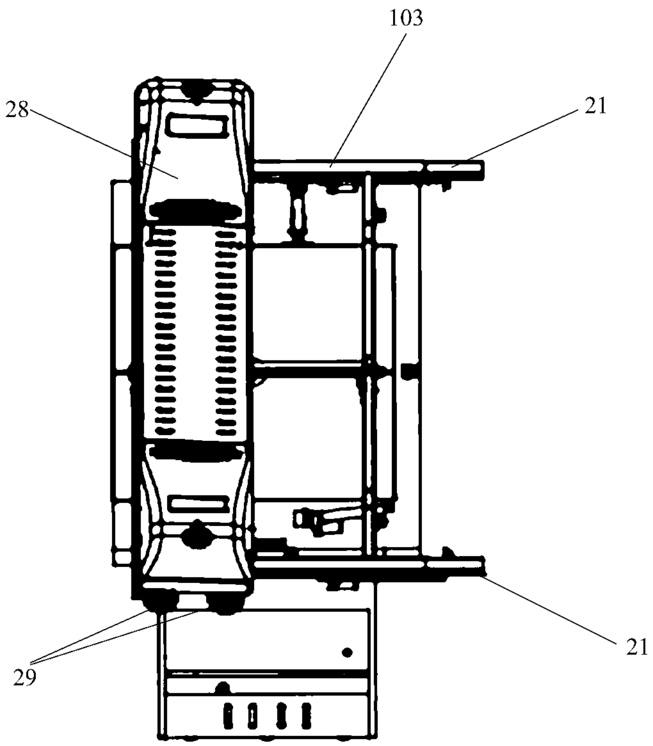
FIG. 7*c* is a top view of the transport apparatus for a cleaning robot of a photovoltaic module after the cleaning robot provided by the first embodiment of the present application is deployed on the loading platform.
Figure 7D:
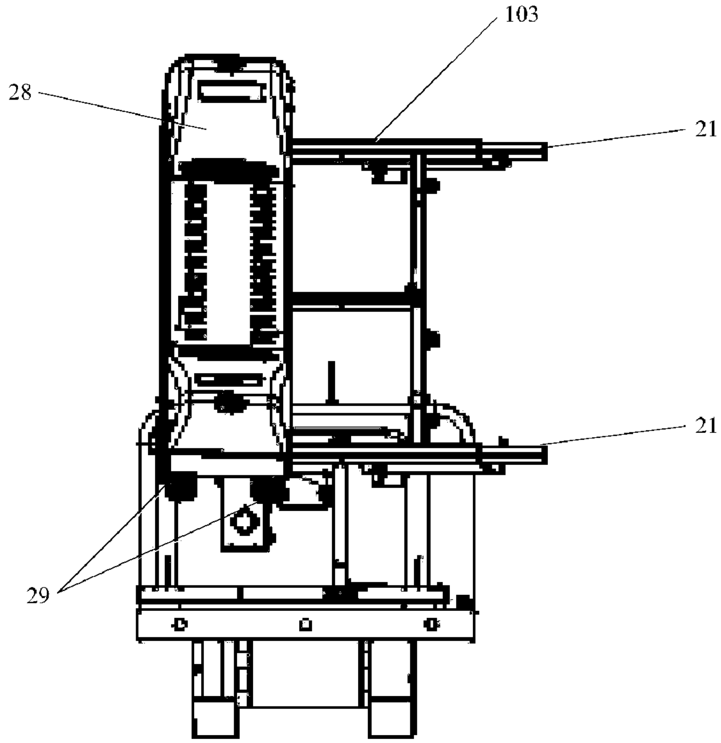
FIG. 7*d* is a rear view of the transport apparatus for a cleaning robot of a photovoltaic module after the cleaning robot provided by the first embodiment of the present application is deployed on the loading platform.

As shown in FIGS. 7*a*, 7*c* and 7*d*, the loading platform 103 also includes: shrinking track 21 and shrinking track motor 22.

The shrinking track 21 is installed on the loading platform 103 facing the installation position of the photovoltaic module, wherein the shrinking track motor 22 is connected with the shrinking track 21.

During practical application, the shrinking track motor 22 drives the shrinking track 21 to move from the loading platform 103 to the edge of the photovoltaic module until the distance between the shrinking track 21 and the edge of the photovoltaic module is within a preset range.

In order to ensure that the distance between the shrinking track 21 and the edge of the photovoltaic module is within a preset range, the first distance sensor 19 and the second distance sensor 20 can be arranged on the top of the shrinking track 21.

The first distance sensor 19 and the second distance sensor 20 are used to measure the third distance between the top of the shrinking track 21 and the edge of the photovoltaic module, and send the third distance to the second controller 7. After receiving the third distance, the second controller 7 judges whether the third distance is within the preset distance range, and if so, stops using the shrinking track motor 22 to push the shrinking track 21. In an optional embodiment of the present application, the preset distance range is generally 5 mm-10 mm.

After completing the alignment between the loading platform and the photovoltaic modules and building the connection channel, the cleaning robot deployed on the loading platform 103 starts from the loading platform 103, passes through the shrinking channel 21 to reach the photovoltaic modules, cleans the photovoltaic modules and then returns to the loading platform 103 along the original path after the photovoltaic module is cleaned. At this time, the second controller 7 controls the shrinking track to push the cylinder 22 to retract the shrinking track 21, and in an optional embodiment of the present application, the distance between the retracted shrinking track 21 and the edge position of the photovoltaic module is: 200 mm-250 mm.

In addition, in one embodiment of the present application, the width of the first side 103*a* of the photovoltaic module should be the same as that of the side of the loading platform 103 facing the photovoltaic module, that is, the width of the shrinking track 21 should be the same as that of the first side

103*a* of the photovoltaic module, so that the cleaning robot can drive smoothly to the photovoltaic modules to complete the cleaning work.

Each distance sensor used in this application can use ultrasonic distance measurement, that is, applying the principle of ultrasonic distance measurement, which is similar to radar distance measurement. The principle is to send out ultrasonic waves first, and then calculate the distance according to the time difference when receiving ultrasonic waves. The propagation speed of ultrasonic waves in the air is 340 m/s. According to the time t (seconds) recorded by the timer, the distance(s) between the emission point and the obstacle can be calculated, namely: s=340t/2).

The use of ultrasonic detection is often relatively fast, convenient, simple to calculate, easy to achieve real-time control, and can meet the requirements of industrial practicality in terms of measurement accuracy.

The distance measuring device in this application helps to avoid obstacles, so that it can acquire distance information (distance and direction) from obstacles in time. In the technical solution disclosed in this application, ultrasonic ranging can be performed in at least three directions (front, left, and right) to obtain obstacles, photovoltaic modules, and other environmental information on the front, left and right sides, and to obtain distance information about the target so as to accurately move to the photovoltaic module to be cleaned.

Please refer to FIG. 7*a*, FIG. 7*b*, FIG. 7*c* and FIG. 7*d*, wherein, FIG. 7*a* is a front view of the transport apparatus for a cleaning robot of a photovoltaic module after the cleaning robot provided by the first embodiment of the present application is deployed on the loading platform; FIG. 7*b* is a side view of the transport apparatus for a cleaning robot of a photovoltaic module after the cleaning robot provided by the first embodiment of the present application is deployed on the loading platform; FIG. 7*c* is a top view of the transport apparatus for a cleaning robot of a photovoltaic module after the cleaning robot provided by the first embodiment of the present application is deployed on the loading platform; FIG. 7*d* is a rear view of the transport apparatus for a cleaning robot of a photovoltaic module after the cleaning robot provided by the first embodiment of the present application is deployed on the loading platform.

Wherein, the cleaning robot includes: a cleaning robot housing 28, a correction wheel 29, a moving wheel 30, a fixed block 31, and a cleaning device 32.

The correction wheels 29 are located at both ends of the cleaning robot, and when the cleaning robot is stationary on the loading platform, the correction wheels 29 are stuck on both sides of the edge of the loading platform 103. The moving wheels 30 and the cleaning device 31 are located at the bottom of the robot housing 28 and are in contact with the upper surface of the loading platform 103.

The fixed blocks 28 are installed symmetrically on the side of the loading platform 103, on the same straight line as the correction wheel, and on the side opposite to the moving direction of the correction wheel. It is used to prevent the cleaning robot from slipping in the direction opposite to the moving direction.

When the cleaning robot is stationary on the loading platform 103, the correction wheel 29 of the cleaning robot is in contact with the fixed block 31.

In order to realize that the correction wheel 29 of the cleaning robot is in contact with the fixed block 31, the length of the cleaning robot should be at least greater than the length of the loading platform.

After the shrinking track 21 establishes a track with the photovoltaic module, the cleaning robot moves from the loading platform 103 to the photovoltaic module through the rolling of the correction wheel 29 and the moving wheel 30. After the cleaning robot arrives at the photovoltaic module, the cleaning device 31 starts to work to clean the photovoltaic module.

Figure 8A:
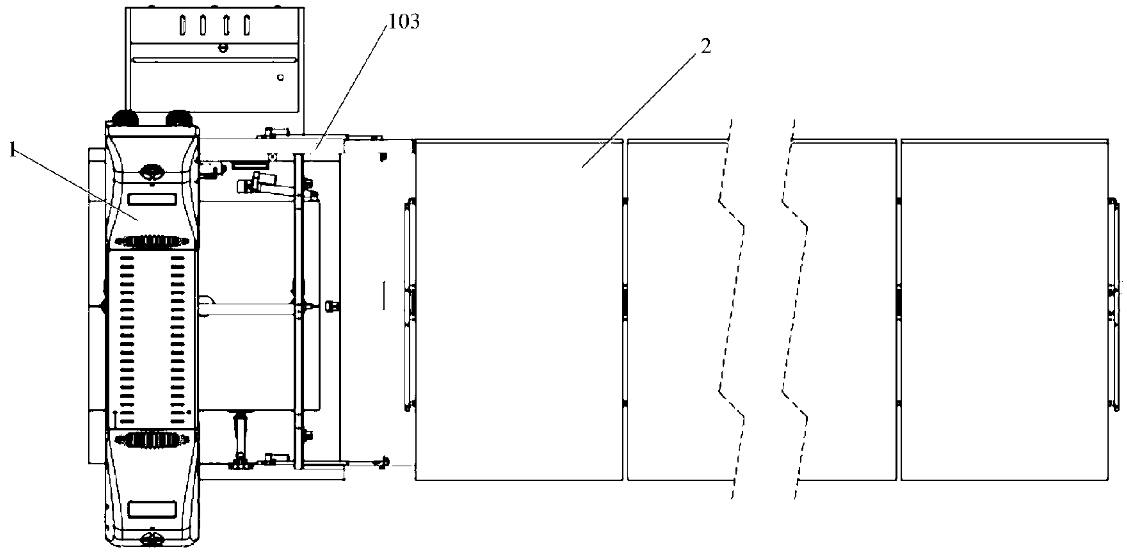
FIG. 8*a* is a schematic diagram of the first state of the cleaning robot provided by the first embodiment of the present application when it is ready to go to the photovoltaic module for cleaning work on the photovoltaic module.
Figure 8B:
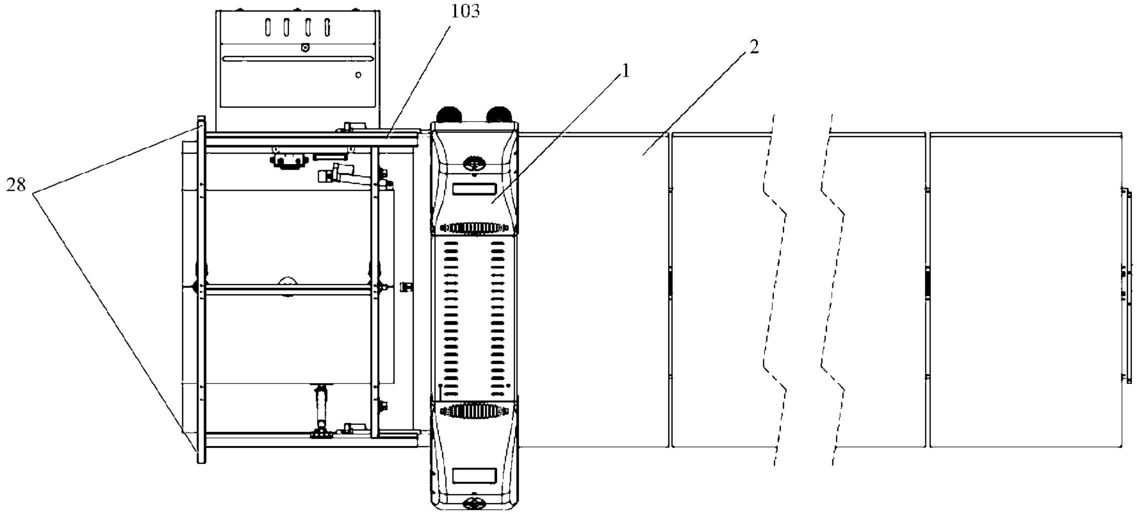
FIG. 8*b* is a schematic diagram of the second state of the cleaning robot in the process of moving towards the photovoltaic module provided by the first embodiment of the present application.
Figure 8C:
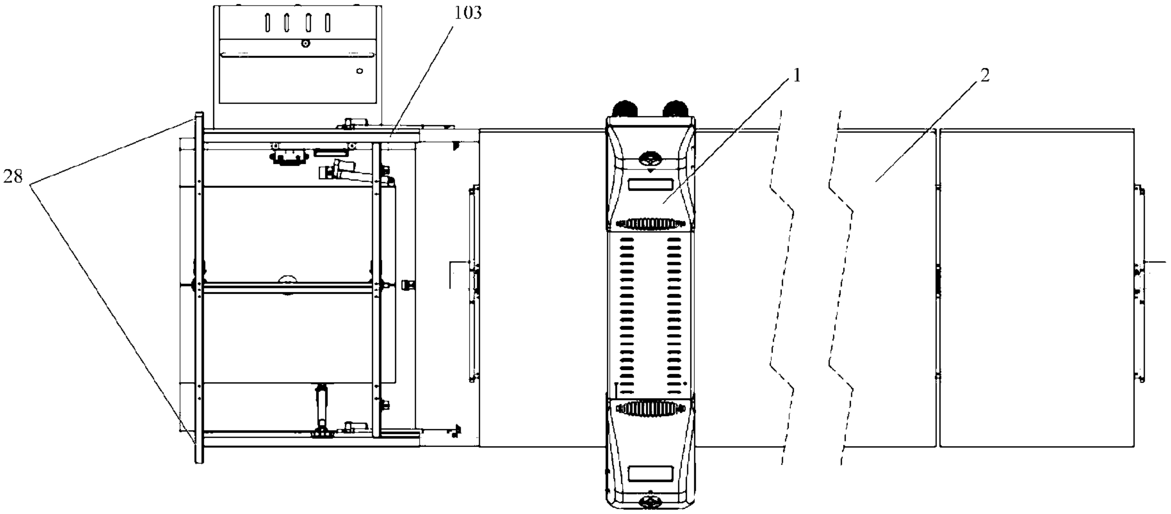
FIG. 8*c* is a schematic diagram of the third state of the cleaning robot moving on the photovoltaic module provided by the first embodiment of the present application.

Please refer to FIG. 8*a*, FIG. 8*b* and FIG. 8*c*, wherein FIG. 8*a* is a schematic diagram of the first state when the cleaning robot provided by the first embodiment of the application is ready to go to the photovoltaic module for cleaning work on the photovoltaic module; FIG. 8*b* is a schematic diagram of the second state of the cleaning robot in the process of moving towards the photovoltaic module provided by an embodiment; FIG. 8*c* is a schematic diagram of the third state of the cleaning robot moving on the photovoltaic module provided by the first embodiment of the present application.

FIG. 8*b* and FIG. 8*c* also include: two symmetrically installed fixed blocks 28.

In the process of cleaning robot 1 moving, the cleaning robot 1 first moves from the position shown in FIG. 8*a* to the photovoltaic module 2, and then enters the position shown in FIG. 8*b*. At this time, one side of the cleaning robot 1 is located at the loading platform 103, and the other side is located at the photovoltaic module 2. Finally, the cleaning robot 1 enters the position shown in FIG. 8*c*. At this time, the cleaning robot 1 is completely located at the photovoltaic module 2.

The cleaning work ends when the cleaning robot 1 runs to the end of the photovoltaic module. The first controller 3 controls the mobile crawler vehicle 2 to go to the next photovoltaic module to be cleaned according to the preset track.

The photovoltaic module cleaning device provided in this application can reach the position corresponding to each photovoltaic module according to the preset moving trajectory through the mobile unit, and then adjust the height and angle of the loading platform for deploying the cleaning robot 1 through the adjustment unit, so that the loading platform is aligned with the photovoltaic module and the cleaning robot can be triggered by the loading platform to clean the photovoltaic module. The device realizes the automatic search and alignment of photovoltaic modules, and completes the cleaning of photovoltaic modules. It eliminates the shortcomings of the prior art that a large number of single row of cleaning robots need to be manually placed, and saves a lot of manpower and material resources.

The second embodiment of the present application also provides another transport apparatus for a cleaning robot of a photovoltaic module. This apparatus is similar in structure to the transport apparatus for a cleaning robot of a photovoltaic module provided in the first embodiment of the present application, and the transport apparatus for a cleaning robot of a photovoltaic module provided in the second embodiment of the present application also includes a mobile unit, an adjustment unit and a loading platform. The following focuses on the adjustment unit of the transport apparatus for a cleaning robot of a photovoltaic module provided in the second embodiment of the present application.

Figure 9A:
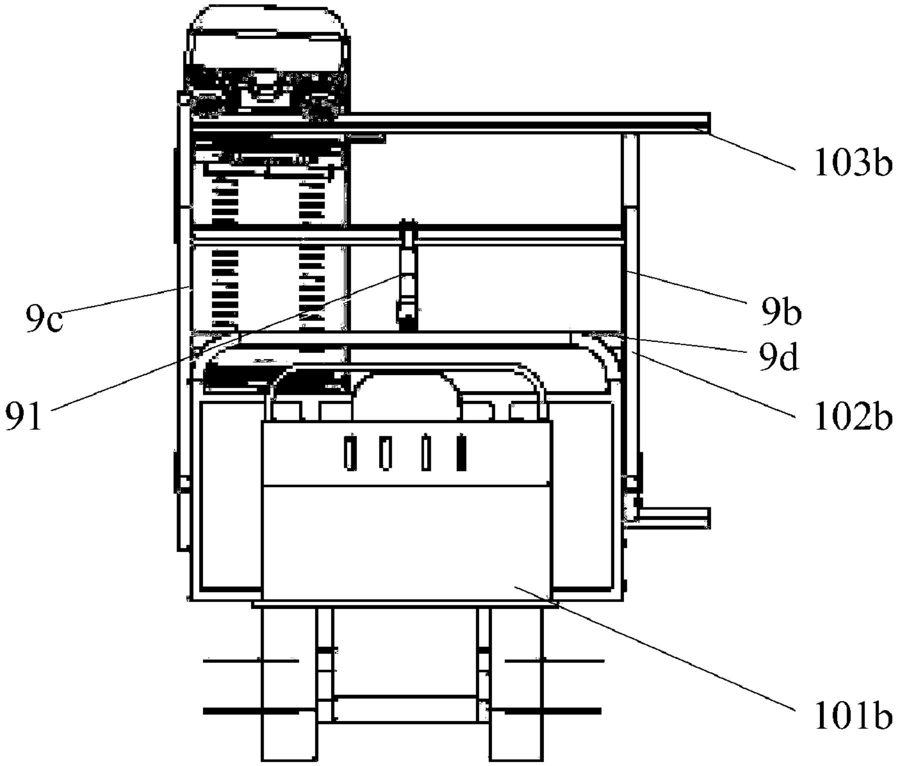
FIG. 9*a* is a front view of the transport apparatus for a cleaning robot of a photovoltaic module provided by the second embodiment of the present application.
Figure 9B:
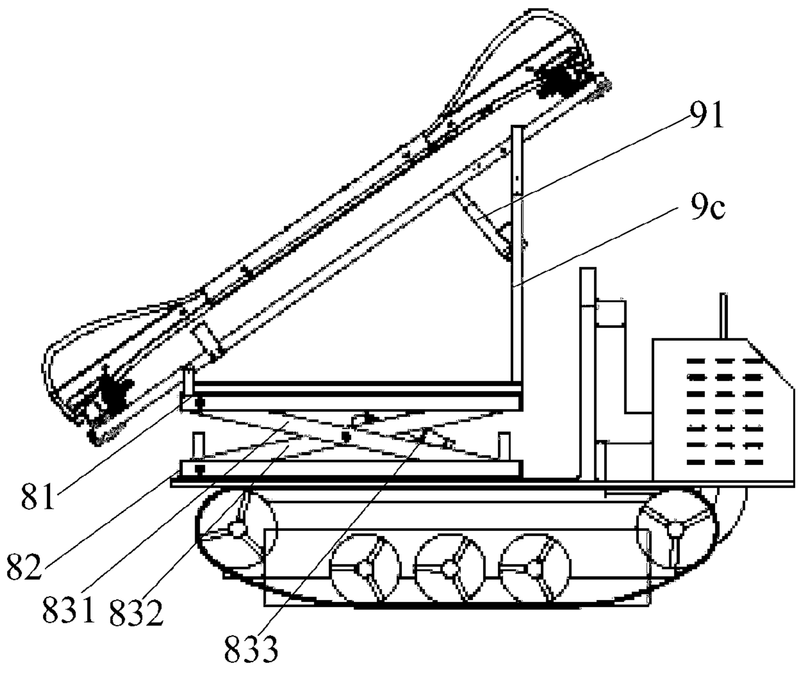
FIG. 9*b* is a side view of the transport apparatus for a cleaning robot of a photovoltaic module provided in the second embodiment of the present application.
Figure 9C:
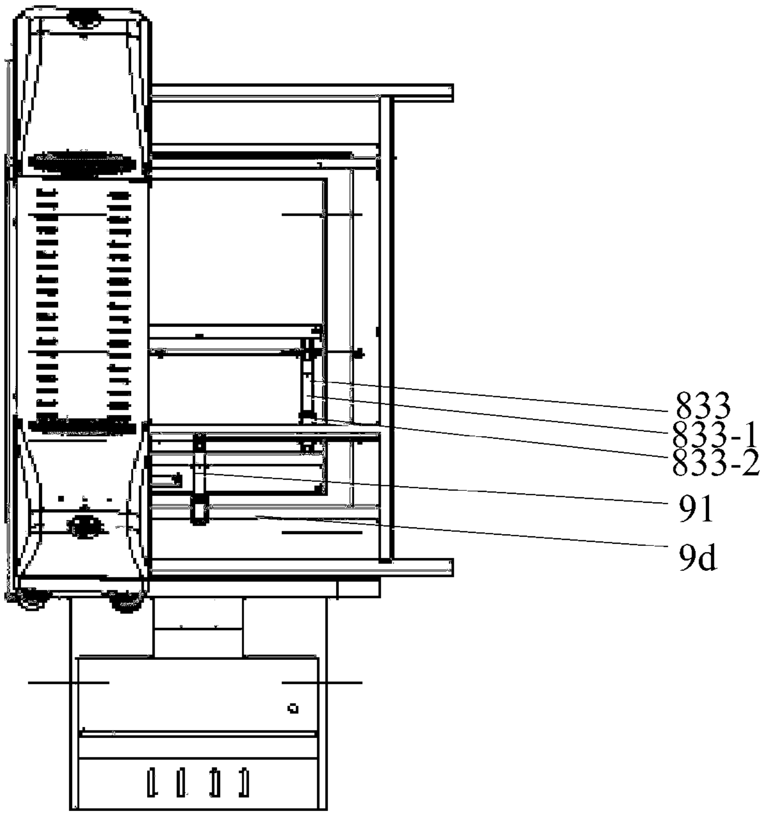
FIG. 9*c* is a top view of the transport apparatus for a cleaning robot of a photovoltaic module provided in the second embodiment of the present application.
Figure 9D:
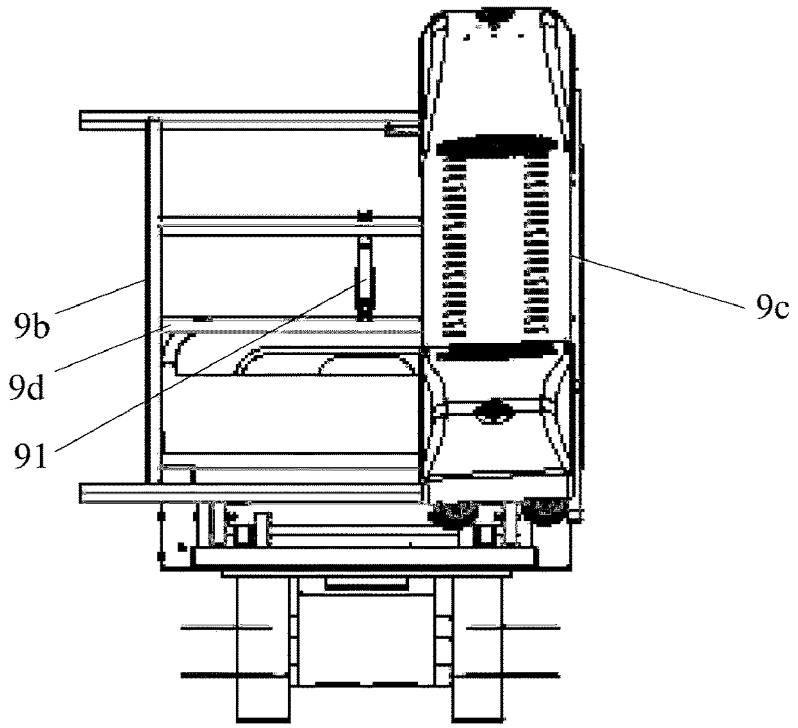
FIG. 9*d* is a rear view of the transport apparatus for a cleaning robot of a photovoltaic module provided in the second embodiment of the present application.
Figure 9E:
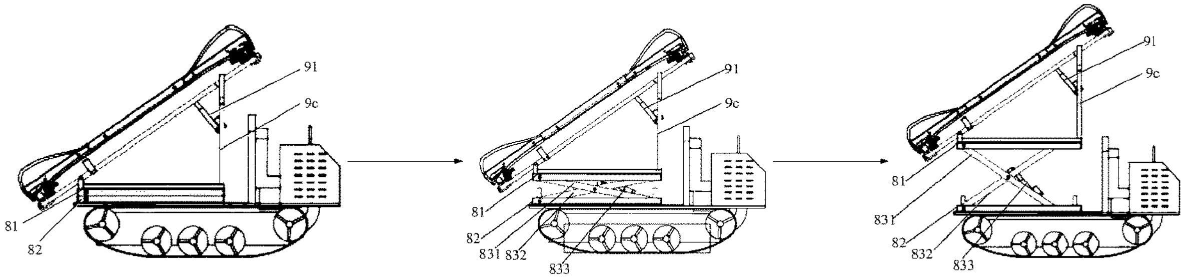
FIG. 9*e* is a side view of the height change of the transport apparatus for a cleaning robot of a photovoltaic module provided by the second embodiment of the present application.

Please refer to FIG. 9*a*, FIG. 9*b*, FIG. 9*c* and FIG. 9*d*. Among them, FIG. 9*a* is a front view of the transport apparatus for a cleaning robot of a photovoltaic module provided in the second embodiment of the application; FIG. 9*b* is a side view of the transport apparatus for a cleaning robot of a photovoltaic module provided in the second embodiment of the application; FIG. 9*c* is a top view of the transport apparatus for a cleaning robot of a photovoltaic module provided by the second embodiment of the application; FIG. 9*d* is a rear view of the transport apparatus for a cleaning robot of a photovoltaic module provided by the second embodiment of the application; FIG. 9*e* is a side view of the height change of the transport apparatus for a cleaning robot of a photovoltaic module provided by the second embodiment of the application, which shows the process of the cleaning robot being raised to the height where it can move to the photovoltaic module.

A photovoltaic module cleaning robot disclosed in this application includes a mobile unit 101*b,* an adjustment unit 102*b,* and a loading platform 103*b*. Wherein the mobile unit 101*b* provided by the second embodiment of the present application is identical to the mobile unit 101 provided by the first embodiment of the present application, and the loading platform 103*b* is also the same as the loading platform 103 provided by the first embodiment of the present application, and will not be carried out here. For details, please refer to the part of the description of the first embodiment above.

The adjustment unit 102*b* includes: the lifting support frame 8*b,* the first loading platform support rod 9*b,* and the second loading platform support rod 9*c*.

Wherein, the lifting support frame 8*b* includes: a first support plate 81, a second support plate 82, and first rod 831 and second rod 832 that are cross-connected.

Wherein, one end of the first rod 831 is connected to the first side of the first support plate 81, and the other end is slidably connected to the second side of the second support plate 82;

One end of the second rod 832 is connected to the first side of the second support plate 82, and the other end is slidably connected to the second side of the first support rod, wherein the first side of the first support plate 81 and the first side of the second support plate face the same direction.

A third height adjustment rod 833 is installed between the first rod 831 and the second rod 832, and the third height adjustment rod 833 includes a telescopic rod 833-1 and a motor 833-2.

Please refer to FIG. 9*e*, which is a schematic diagram of raising the transport apparatus for a cleaning robot of a photovoltaic module provided in the second embodiment of the present application. When the loading platform 103*b* needs to be adjusted to rise, the motor 833-2 drives the telescopic rod 833-1 to extend, so that the other ends of the first rod 831 and the second rod 832 slide towards the inside of the first support plate 81 and the second support plate 82 so as to increase the overall height of the adjustment unit 103*b*.

Similarly, when the loading platform 103*b* needs to be adjusted to descend, the motor 833-2 drives the telescopic rod 833-1 to shorten, so that the other ends of the first rod 831 and the second rod 832 slide towards the outer side of the first support plate 81 and the second support plate 82, thereby lowering the overall height of the adjustment unit 103*b*.

The first loading platform support rod 9*b* and the second loading platform support rod 9*c* are symmetrically installed on the upper part of the second support plate 82, and a beam 9*d* is arranged between the first loading platform support rod and the second loading platform support rod, and an angle adjustment rod 91 is arranged in the middle position of the beam.

Both ends of the angle adjustment rod 91 are respectively connected to the beam 9*d* and one side of the bottom of the loading platform 103*b* through the universal bearing 6.

The other side of the bottom of the loading platform 103 is movably connected with the tail of the second support plate 82.

Figure 12:
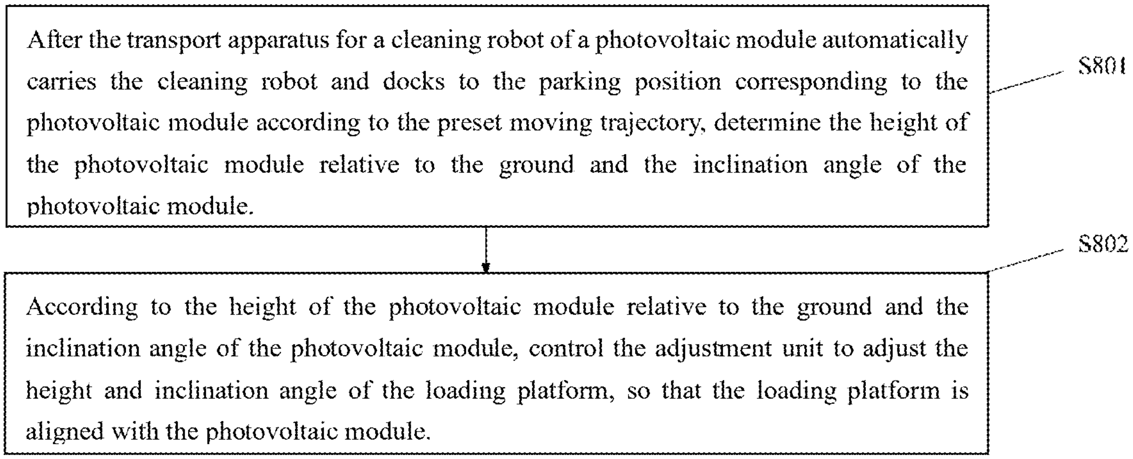
FIG. 12 is a flowchart of a cleaning method for a photovoltaic module provided in the second embodiment of the present application.

When the angle of the loading platform 103 needs to be adjusted, the motor 833-2 drives the telescopic rod 833-1 to extend or shorten to push the loading platform 103 to rotate around the bottom of the loading platform 103, thereby changing the angle of the loading platform 103. Corresponding to the device embodiment provided in this application, the third embodiment of the application also provides a cleaning method for photovoltaic modules, which is applied to the device for cleaning photovoltaic modules provided above. Please refer to FIG. 12, which is a flow chart of cleaning method for photovoltaic modules provided by the present application.

The method includes: step S801-step S802.

Step S801, after the transport apparatus for a cleaning robot of a photovoltaic module automatically carries the cleaning robot and docks to the parking position corresponding to the photovoltaic module according to the preset moving trajectory, determine the height of the photovoltaic module relative to the ground and the inclination angle of the photovoltaic module;

The step S801 is the process in which the first controller 3 controls the crawler vehicle 2 to move to the designated parking position according to the moving trajectory in the first embodiment of the present application; the step S801 is also the process in which the third radar 13 obtains the height of the photovoltaic module relative to the ground and the process in which the goniometer 15 detects the inclination angle of the photovoltaic module. No more details will be given here, and the relevant parts can refer to the above-mentioned introduction to the transport apparatus for a cleaning robot of a photovoltaic module.

Figure 10A:
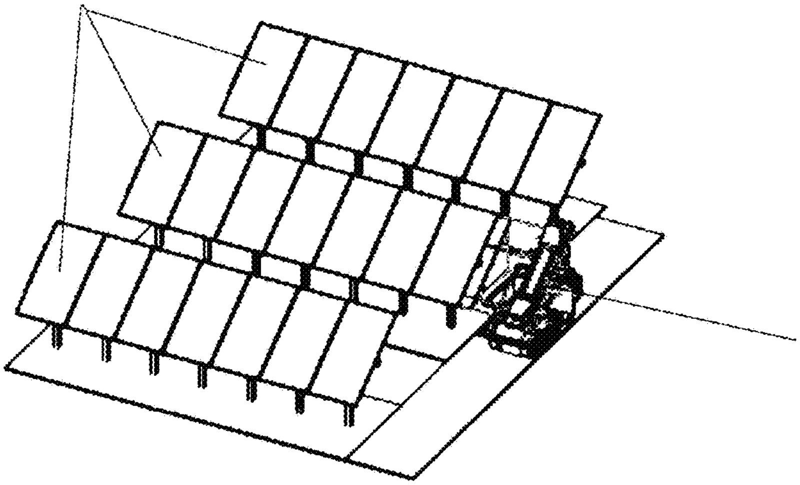
FIG. 10*a* is a perspective view after the loading platform and the photovoltaic module are aligned according to the third embodiment of the present application.
Figure 10B:
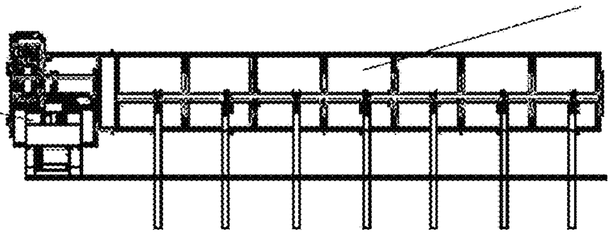
FIG. 10*b* is a front view after the loading platform and the photovoltaic module are aligned according to the third embodiment of the present application.
Figure 10C:
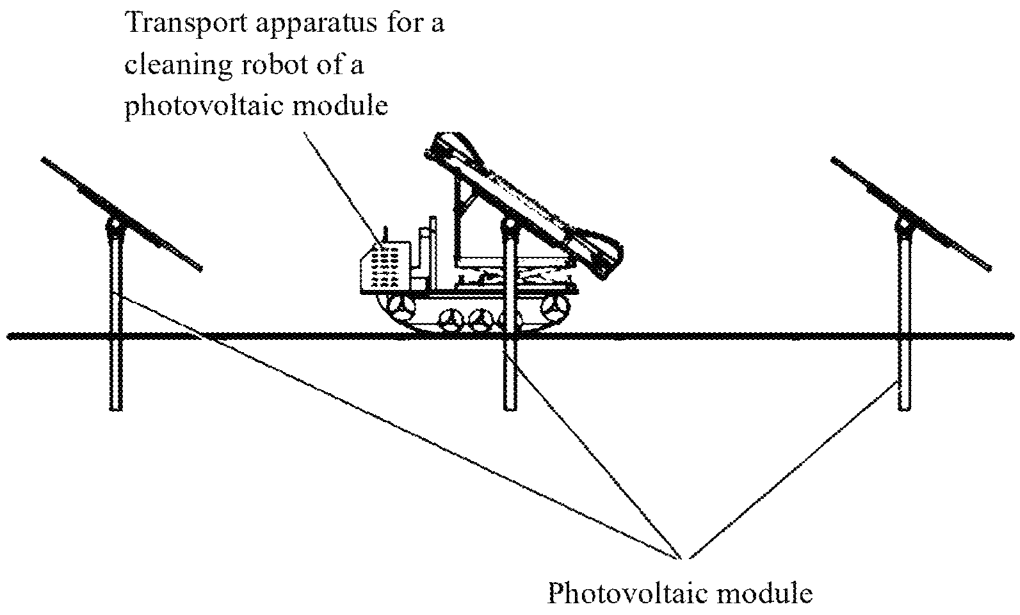
FIG. 10*c* is a side view after the loading platform and the photovoltaic module are aligned according to the third embodiment of the present application.
Figure 10D:
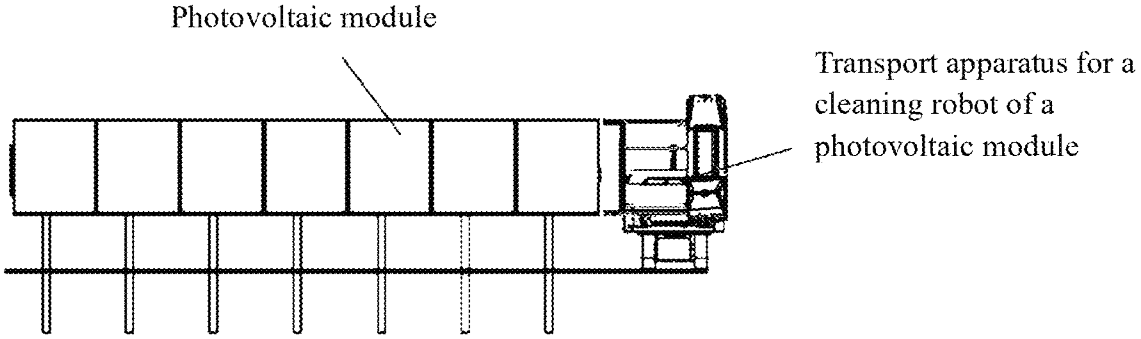
FIG. 10*d* is a rear view after the loading platform and the photovoltaic module are aligned according to the third embodiment of the present application.

Step S802, according to the height of the photovoltaic module relative to the ground and the inclination angle of the photovoltaic module, control the adjustment unit to adjust the height and inclination angle of the loading platform, so that the loading platform is aligned with the photovoltaic module;

Please refer to FIGS. 10*a*, 10*b*, 10*c*, and 10*d*, wherein FIG. 10*a* is a perspective view of the alignment of the loading platform and photovoltaic modules provided by the third embodiment of the present application; FIG. 10*b* is a front view of the alignment of the loading platform and photovoltaic modules provided by the third embodiment of the present application; FIG. 10*c* is a side view of the alignment of the loading platform and the photovoltaic module provided by the third embodiment of the present application; FIG. 10*d* is a rear view of the alignment of the loading platform and the photovoltaic module provided by the third embodiment of the present application.

As shown in the figure, the loading platform is aligned with the photovoltaic module, that is, the loading platform and the photovoltaic module are on the same horizontal level.

Before step S802, it also includes: adjusting the direction of the departure side of the cleaning robot on the loading platform to face the photovoltaic module. This step is the process in which the second controller 3 in the first embodiment of the present application controls the loading platform direction adjustment rod 18 to adjust the direction of the loading platform, which will not be repeated here, and for the relevant parts, please refer to the above-mentioned introduction of the transport apparatus for a cleaning robot of a photovoltaic module.

Each telescopic rod disclosed in the present application is a linear actuator, and the actuator includes a fixed end and a movable end. Driven by a driving motor, the linear actuator controls the extending and shortening of the movable end to change the length of the linear actuator.

Linear Actuator is an electrically-powered device that converts the rotary motion of the motor into the linear reciprocating motion of the actuator. It is mainly a new type of linear actuator consisting of a drive motor, a reduction gear, a screw, a nut, a guide sleeve, an actuator, a sliding seat, a spring, a housing, a turbine, and a micro-control switch. It can realize remote control and centralized control. The principle is: after the motor is decelerated by the gear, it drives a pair of screw nuts to change the rotational motion of the motor into a linear motion, and the actuator action is completed by using the forward and reverse rotation of the motor.

Although the present application is disclosed as above with preferred embodiments, it is not intended to limit the present application. Any person skilled in the art can make possible changes and modifications without departing from the spirit and scope of the present application. Therefore, the scope of protection of the present application should be based on the scope defined by the claims of this application.

The invention claimed is:

1. A transport apparatus for a cleaning robot of a photovoltaic module, the photovoltaic module comprising a plurality of solar panels and a support part, characterized in that it comprises: a mobile unit, an adjustment unit, and a loading platform;

The mobile unit is configured to move according to the first moving trajectory, carry and automatically transport the adjustment unit, the loading platform and a cleaning robot to a parking position corresponding to the photovoltaic module; wherein the mobile unit further includes a first memory and a first controller, the first memory is used to acquire the first layout information, and the first controller generates the first moving trajectory according to the first layout information;

The adjustment unit is installed above the mobile unit, and is used to adjust the height and inclination angle of the loading platform at the parking position, so that the loading platform is aligned with the photovoltaic module; and The loading platform is arranged on the adjustment unit and is used to carry the cleaning robot, wherein the outer side of the mobile unit includes a plurality of first radars;

The plurality of first radars are used to detect the position information of obstacles on the moving trajectory of the mobile unit when the mobile unit moves according to the preset moving trajectory, and send the position information of the obstacles to the first controller;

The first controller is further configured to receive position information of the obstacle, and update the first moving trajectory to avoid the position of the obstacle.

2. The transport apparatus for a cleaning robot of a photovoltaic module according to claim 1, characterized in that a second radar is installed in the middle of the side of the mobile unit facing the photovoltaic module;

The second radar is used to detect the support part of the photovoltaic module, obtain distance information between the mobile unit and the support part, and send the distance information to the first controller, so that the first controller controls the mobile unit to move to the parking position.

3. The transport apparatus for a cleaning robot of a photovoltaic module according to claim 2, characterized in that, the second radar detects the support part of the photovoltaic module in the following manner to obtain the distance between the mobile unit and the support part:

Obtain moving speed information of the mobile unit;

Obtain a complete time length that the support part is detected by the second radar;

Obtain the size and center information of the support part according to the moving speed information of the mobile unit and the complete time length;

Obtain the time information of the mobile unit traveling in the direction of the moving trajectory during the detection process, and obtain the distance between the mobile unit and the support part according to the time information, the moving speed information, and the size and center information of the support part.

4. The transport apparatus for a cleaning robot of a photovoltaic module according to claim 2, characterized in that a first support part and a second support part are installed on the bottom of the photovoltaic module, and the first support part and the second support part are symmetrical installed on both sides of the central position of the photovoltaic module;

The second detection radar detects the support part of the photovoltaic module in the following manner to obtain the distance information between the mobile unit and the central position:

Obtain moving speed information of the mobile unit;

Obtain the complete time length from the appearance of the first support part to the disappearance of the second support part in the detection field of view;

Obtain center information of the first support part and the second support part according to the moving speed information of the mobile unit and the complete time length;

Obtain the time information of the mobile unit traveling in the direction of the moving trajectory during the detection process, and obtain the distance between the mobile unit and the parking position according to the time information, the moving speed information and the center information.

5. The transport apparatus for a cleaning robot of a photovoltaic module according to claim 1, characterized in that, the mobile unit is equipped with a second controller, and the second controller is used to adjust the height, inclination angle and direction of the loading platform according to the installation height and the preset inclination angle of the photovoltaic module;

The adjustment unit includes: a support plate, and a first loading platform height adjustment rod and a second loading platform height adjustment rod; wherein, the first loading platform height adjustment rod and the second loading platform height adjustment rod are respectively vertically installed at the center position of the first and second edges of the support plate, the first loading platform height adjustment rod is installed at the center position of the support plate facing the first edge of the photovoltaic module, the height of the second loading platform height adjustment rod is installed at the center of the second edge of the support plate away from the photovoltaic module;

The tops of the first loading platform height adjustment rod and the second loading platform height adjustment rod are respectively connected to the loading platform;

The first loading platform height adjustment rod includes: a first telescopic rod and a first motor;

The second loading platform height adjustment rod includes: a second telescopic rod and a second motor;

Both ends of the first telescopic rod are respectively connected to the support plate and the loading platform, and the first motor is fixed at one end of the first telescopic rod connected to the support plate to drive the other end of the first telescopic rod connected to the loading platform telescoping;

Both ends of the second telescopic rod are respectively connected to the support plate and the loading platform, and the second motor is fixed at one end of the second telescopic rod connected to the support plate to drive the other end of the second telescopic rod connected to the loading platform telescoping.

6. The transport apparatus for a cleaning robot of a photovoltaic module according to claim 5, characterized in that the adjustment unit further comprises: a loading platform angle adjustment rod;

One side of the loading platform angle adjustment rod is movably connected to the tail of the support plate, and the other side is movably connected to the tail of the loading platform;

The loading platform angle adjustment rod includes: a third telescopic rod and a third motor;

Both ends of the third telescopic rod are respectively connected to the end of the support plate and the loading platform opposite to the moving direction; the third motor is fixed at one end of the third telescopic rod to drive the third telescopic rod telescoping.

7. The transport apparatus for a cleaning robot of a photovoltaic module according to claim 6, characterized in that the loading platform is equipped with a second goniometer;

The second goniometer is used to detect the inclination angle of the loading platform along the travel direction of the mobile unit, and send the inclination angle to the second controller;

The second controller is used to obtain the installation inclination angle of the photovoltaic module, and when the installation inclination angle is different from the inclination angle measured by the second goniometer, the second controller controls the loading platform adjustment rod to push the third telescopic rod connected to the tail of the loading platform to telescope until the angle measured by the second goniometer is the same as the installation inclination angle.

8. The transport apparatus for a cleaning robot of a photovoltaic module according to claim 6, characterized in that, a fourth radar and a fifth radar are respectively installed on the side of the loading platform facing the photovoltaic module and on both sides of the center of the loading platform;

The fourth radar and the fifth radar are used to detect the edge of the photovoltaic module, and send the detection result to the second controller;

The second controller is used to control the angle loading platform adjustment rod to push the loading platform to adjust the inclination angle of the loading platform when the fourth radar and the fifth radar do not detect the edge of the photovoltaic module at the same time, until the first photovoltaic module edge detection radar and the second photovoltaic module detection radar simultaneously detect the edge of the photovoltaic module.

9. The transport apparatus for a cleaning robot of a photovoltaic module according to claim 5, characterized in that, the device further comprises: loading platform direction adjustment rod;

One side of the loading platform direction adjustment rod is installed on the upper part of the mobile unit, and the other side is movably connected to the bottom of the adjustment unit;

The loading platform direction adjustment rod includes: a fourth telescopic rod and a fourth motor;

Both ends of the fourth telescopic rod are respectively connected to the upper part of the mobile unit and the bottom of the adjustment unit; the fourth motor is fixed at one end of the fourth telescopic rod, and drives the fourth telescopic rod telescoping.

10. The transport apparatus for a cleaning robot of a photovoltaic module according to claim 9, characterized in that, a first distance sensor and a second distance sensor are respectively installed on the side of the loading platform facing the photovoltaic module and on both sides of the center of the loading platform;

The first distance sensor is used to determine the first distance between the installation position of the first distance sensor and the edge of the photovoltaic module;

the second distance sensor is used to determine the second distance between the installation position of the second distance sensor and the edge of the photovoltaic module;

The second controller is configured to control the loading platform direction adjustment push rod to adjust the direction of the loading platform when the first distance and the second distance are different, until the first distance is the same as the second distance.

11. The transport apparatus for a cleaning robot of a photovoltaic module according to claim 5, characterized in that a third radar is installed at the center of the loading platform;

The third radar is used to detect the height of the photovoltaic module relative to the ground, and send the height of the photovoltaic module to the second controller;

The second controller is configured to control the first loading platform height adjustment rod and the second loading platform height adjustment rod to adjust the height of the loading platform from the ground according to the installation height of the photovoltaic module, until the height of the loading platform from the ground is the same as the height of the photovoltaic module relative to the ground.

12. The transport apparatus for a cleaning robot of a photovoltaic module according to claim 5, characterized in that, the loading platform is equipped with a first goniometer;

The first goniometer is used to detect the inclination angle of the loading platform facing the installation position of the photovoltaic module, and send the inclination angle to the second controller;

The second controller is configured to control the first telescopic rod and/or the second telescopic rod to telescope when the inclination angle is not zero, so that one side of the loading platform rises or falls until the inclination angle detected by the first goniometer is zero.

13. The transport apparatus for a cleaning robot of a photovoltaic module according to claim 5, characterized in that the loading platform further comprises: a telescopic track, a track motor and a third distance sensor, and the track motor is used to drive the telescopic track;

The third distance sensor is used to determine the third distance between the telescopic track and the photovoltaic module;

The second controller is configured to obtain the third distance, and when the third distance is greater than a preset distance threshold, the second controller controls the track motor to drive the telescopic track to extend towards the photovoltaic module, so as to make the third distance not greater than the preset distance threshold.

14. A transport method for a cleaning robot of a photovoltaic module, characterized in that it is applied to the transport apparatus described in claim 1, comprising:

After the mobile unit carries and automatically transports the adjustment unit, the loading platform and the cleaning robot to the parking position corresponding to the photovoltaic module according to the first moving trajectory, the height of the photovoltaic module relative to the ground and the inclination angle of the photovoltaic module are determined;

According to the height of the photovoltaic module relative to the ground and the inclination angle of the photovoltaic module, the adjustment unit is controlled to adjust the height and inclination angle of the loading platform so that the loading platform is aligned with the photovoltaic module, wherein the position on the first moving trajectory corresponding to the support part of the photovoltaic module is set as the parking position of the transport apparatus for a cleaning robot of a photovoltaic module;

The transport apparatus for a cleaning robot of a photovoltaic module determines the distance between the transport apparatus for a cleaning robot of a photovoltaic module and the parking position by the following method:

Obtain moving speed information of the mobile unit;

Obtain the complete time length that the support part is detected by the second detection radar, and the second detection radar is arranged at the middle position of the side of the mobile unit facing the photovoltaic module;

Obtain the size and center information of the support part according to the moving speed information of the mobile unit and the complete time length;

Obtain the time information of the mobile unit traveling in the direction of the moving trajectory during the detection process, and obtain the distance information between the mobile unit and the parking position according to the time information, the moving speed information, and the size and center information of the support part.

15. The transport method for a cleaning robot of a photovoltaic module according to claim 14, characterized in that, the first moving trajectory is obtained by the following manner:

Obtain the first moving trajectory sent by the photovoltaic power station through the wireless communication system;

Or,

Obtain the first layout information of the photovoltaic modules in the photovoltaic power station sent by the photovoltaic power station through the wireless communication system; according to the first layout information, obtain the first moving trajectory information.

16. The transport method for a cleaning robot of a photovoltaic module according to claim 14, characterized in that, according to the height of the photovoltaic module relative to the ground and the inclination angle of the photovoltaic module, the adjustment unit is controlled to adjust the height and inclination angle of the loading platform from the ground, so that the loading platform is aligned with the photovoltaic module, including:

According to the height of the photovoltaic module relative to the ground, the method controls the first loading platform height adjustment rod and the second loading platform adjustment rod in the adjustment unit to adjust the height of the loading platform from the ground, so that the height of the loading platform from the ground is the same as the height of the photovoltaic module relative to the ground;

According to the inclination angle, the method controls the loading platform angle adjustment rod in the adjustment unit to adjust the inclination angle of the loading platform, so that the inclination angle of the loading platform is the same as the inclination angle of the photovoltaic module.

17. The transport method for a cleaning robot of a photovoltaic module according to claim 14, characterized in that the method further comprises:

Obtain the angle of the loading platform facing the photovoltaic module;

If the angle of the loading platform facing the photovoltaic module is not zero, then by adjusting the length of the first loading platform height adjustment rod or the second loading platform height adjustment rod in the adjustment unit, change the angle of the loading platform facing the photovoltaic module until the angle is zero.

18. The transport method for a cleaning robot of a photovoltaic module according to claim 14, characterized in that, according to the preset angle of the photovoltaic module, adjust the angle from the loading platform to be the same as the preset angle of the photovoltaic module, including:

Obtain the actual angle of the photovoltaic module;

Obtain the current angle of the loading platform;

When the actual angle is different from the current angle, the inclination angle of the loading platform is changed through the loading platform angle adjustment rod installed at the rear of the adjustment unit until the adjusted angle of the loading platform is the same as the actual angle.

19. The transport method for a cleaning robot of a photovoltaic module according to claim 14, characterized in that the loading platform further comprises: a telescopic track, a track motor and a third distance sensor, and the track motor is used to drive the telescopic track;

The third distance sensor is used to determine a third distance between the telescopic track and the photovoltaic module;

The second controller is configured to obtain the third distance, and when the third distance is greater than a preset distance threshold, the second controller controls the track motor to drive the telescopic track to extend towards the photovoltaic module, so that the third distance is not greater than the preset distance threshold and the cleaning robot moves to the surface of the photovoltaic module via the track.

* * * * *